(12) United States Patent
Park et al.

(10) Patent No.: US 10,492,107 B2
(45) Date of Patent: Nov. 26, 2019

(54) SPS CONFIGURATION DURING HANDOVER

(71) Applicant: Ofinno Technologies, LLC, Herndon, VA (US)

(72) Inventors: Kyungmin Park, Arlington, VA (US); Esmael Hejazi Dinan, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 60 days.

(21) Appl. No.: 15/802,834

(22) Filed: Nov. 3, 2017

(65) Prior Publication Data
US 2018/0124648 A1 May 3, 2018

Related U.S. Application Data

(60) Provisional application No. 62/417,169, filed on Nov. 3, 2016.

(51) Int. Cl.
*H04W 36/00* (2009.01)
*H04W 36/22* (2009.01)
(Continued)

(52) U.S. Cl.
CPC ... *H04W 36/0005* (2013.01); *H04W 36/0072* (2013.01); *H04W 36/22* (2013.01); *H04W 24/10* (2013.01); *H04W 36/38* (2013.01)

(58) Field of Classification Search
None
See application file for complete search history.

(56) References Cited

U.S. PATENT DOCUMENTS 8,331,326 B2 * 12/2012 Wang ............... H04J 11/0069
370/332
8,989,143 B2 * 3/2015 Wang ............... H04J 11/0069
370/331
(Continued)

OTHER PUBLICATIONS

3GPP TS 36.300 V14.0.0 (Sep. 2016); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14).
(Continued)

*Primary Examiner* — Alpus Hsu
(74) *Attorney, Agent, or Firm* — David Grossman; Kavon Nasabzadeh; Philip Smith

(57) ABSTRACT

A first base station receives a UE assistance information message from a wireless device. The UE assistance information message comprises traffic pattern parameters for SPS traffic of the wireless device. The traffic pattern parameters comprise: a first traffic periodicity of a first traffic of the one or more SPS traffic; a first timing offset of the first traffic; and a first message size of the first traffic. The first base station sends, to a second base station, a request message for a handover of the wireless device. The request message comprises the traffic pattern parameters. The first base station receives from the second base station, a handover request acknowledge message indicating SPS configuration parameter(s) for SPS radio resources determined based at least on the traffic pattern parameters. The first base station transmits to the wireless device, a handover command message indicating the SPS configuration parameter(s).

20 Claims, 16 Drawing Sheets

(51) Int. Cl.
*H04W 24/10* (2009.01)
*H04W 36/38* (2009.01)

(56) References Cited

U.S. PATENT DOCUMENTS

| | | | | |
|---|---|---|---|---|
| 8,995,330 | B2* | 3/2015 | Morioka | H04B 7/155 370/315 |
| 9,131,413 | B2* | 9/2015 | Van Lieshout | H04W 36/0055 |
| 9,398,511 | B2* | 7/2016 | Zhang | H04W 36/0055 |
| 9,420,572 | B2* | 8/2016 | Lee | H04L 1/0026 |
| 9,485,692 | B2* | 11/2016 | Sawhney | H04W 36/24 |
| 9,497,671 | B2* | 11/2016 | Wang | H04J 11/0069 |
| 9,554,397 | B2* | 1/2017 | Cai | H04W 72/14 |
| 9,591,631 | B2* | 3/2017 | You | H04L 5/001 |
| 9,609,552 | B2* | 3/2017 | Ramachandran | H04W 36/0033 |
| 9,693,306 | B2* | 6/2017 | Young | H04W 52/0235 |
| 9,743,319 | B2* | 8/2017 | Wu | H04W 36/0027 |
| 9,854,525 | B2* | 12/2017 | Wang | H04J 11/0069 |
| 9,907,055 | B2* | 2/2018 | Yang | H04L 1/1812 |
| 9,936,468 | B2* | 4/2018 | Dai | H04W 52/146 |
| 10,009,800 | B2* | 6/2018 | Hahn | H04W 36/18 |
| 10,182,376 | B2* | 1/2019 | Zhu | H04W 36/0061 |
| 2010/0113058 | A1* | 5/2010 | Wu | H04W 72/02 455/452.1 |
| 2010/0278141 | A1* | 11/2010 | Choi-Grogan | H04W 4/90 370/331 |
| 2011/0306344 | A1* | 12/2011 | Chen | H04W 36/0066 455/436 |
| 2014/0161111 | A1* | 6/2014 | Kim | H04W 56/0005 370/336 |
| 2015/0271798 | A1* | 9/2015 | Chen | H04L 1/1812 370/329 |
| 2015/0334637 | A1* | 11/2015 | Kim | H04W 48/12 370/312 |

OTHER PUBLICATIONS

3GPP TS 36.423 V14.0.0 (Sep. 2016); Technical Specification; 3rd Generation Partnership Project; Technical Specification Group Radio Access Network; Evolved Universal Terrestrial Radio Access Network (E-UTRAN); X2 application protocol (X2AP) (Release 14).
R2-166176; 3GPP TSG-RAN WG2 Meeting #95bis; Kaohsiung, Oct. 10-14, 2016; Source: CATT; Title: Consideration on P2X.
R2-166594; 3GPP TSG-RAN WG2 Meeting #95bis;; Kaohsiung, Oct. 10-14, 2016; Agenda Item: 8.13.3; Source: Coolpad; Title: Discussion on power saving for P-UE.
R2-166173; 3GPP TSG-RAN WG2 Meeting #95bis; Kaohsiung, Oct. 10-14, 2016; Source: CATT; Title: Impact of Multiple TMGI; Agenda Item: 8.13.1.
R2-166174; 3GPP TSG-RAN WG2 Meeting #95bis; Kaohsiung, Oct. 10-14, 2016; Title: [Draft] LS Response on Multiple TMGIs for support of small and variable MBMS areas.
R2-166175; 3GPP TSG RAN WG2 Meeting #95bis; Kaohsiung, Taiwan, Oct. 10-14, 2016; Source: CATT; Title: Discussion on V2X SPS.
R2-166189; 3GPP TSG-RAN2 Meeting #95bis; Kaohsiung, Oct. 10-14, 2016; Agenda Item:8.13.2; Source: OPPO; Title: Discussion on Details of V2X SPS Enhancements.
R2-166190, 3GPP TSG-RAN2 Meeting #95bis; Kaohsiung, Oct. 10-14, 2016; Agenda Item:8.13.3; Source: OPPO; Title: Discussion on V2P.
R2-166261; 3GPP TSG RAN WG2 Meeting #95bis; Kaohsiung, Oct. 10-14, 2016; Agenda item: 8.13.3; Source: Intel Corporation; Title: Resource pool management.
R2-166297; 3GPP TSG RAN WG2 Meeting #95-bis; Kaohsiung, Oct. 10-14, 2016; Agenda Item: 8.13.1; Source: Huawei, HiSilicon; Title: Inter-PLMN operation for Uu-based V2X.
R2-166298, 3GPP TSG RAN WG2 Meeting #95-bis; Kaohsiung, Oct. 10-14, 2016; Agenda Item: 8.13.3; Source: Huawei, HiSilicon; Title: Discussion on P2X Sidelink Communication.
R2-166299; 3GPP TSG RAN WG2 Meeting #95-bis; Kaohsiung, Oct. 10-14, 2016; Agenda Item: 8.13.2; Source: Huawei, HiSilicon; Title: Enhancements of Uplink SPS for Uu-based V2X.
R2-166300; 3GPP TSG RAN WG2 Meeting #95-bis; Kaohsiung, Oct. 10-14, 2016; Agenda Item: 8.13.2; Source: Huawei, HiSilicon; Title: Further Discussion of SPS over Sidelink.
R2-166431; 3GPP TSG RAN WG2 Meeting #95bis; Kaohsiung, Oct. 10-14, 2016; Source: ITL; Title: Reporting issues on SL SPS.
R2-166465; 3GPP TSG-RAN WG2 Meeting #95bis; Kaohsiung, Taiwan, Oct. 10-14, 2016; Agenda: 8.13.1; Source: MediaTek; Title: SC-PTM Enhancements for LTE V2X.
R2-166466; 3GPP TSG-RAN WG2 Meeting #95bis; Kaohsiung, Taiwan, Oct. 10-14, 2016; Agenda: 8.13.1; Source: MediaTek; Title: On suitability of Uu transport and PC5 transport for V2X Solutions.
R2-166471; 3GPP TSG-RAN WG2 Meeting #95bis; Kaohsiung, Oct. 10-14, 2016; Source: Potevio; Title: Discussion on Sidelink SPS configuration and UE assistant information.
R2-166489; 3GPP TSG-RAN WG2 Meeting#95b; Kaohsiung, Oct. 10-14, 2016; Agenda item: 8.13.3; Source: Fujitsu; Title: Discussion on power saving for V2P communications.
R2-166609; 3GPP TSG-RAN WG2 Meeting #95bis; Kaohsiung, Oct. 10-14, 2016; Title: Discussion on V2P aspects; Source: ZTE.
R2-166616; 3GPP TSG-RAN WG2 #95bis; Kaohsiung, Oct, 10-14, 2016; Agenda Item: 8.13.2; Source: ZTE; Title: Discussion on SPS related issues.
R2-166721; 3GPP TSG-RAN WG2 Meeting #95bis; Kaohsuing, Oct. 10-14, 2016; Agenda item: 8.13.2; Source: Qualcomm Incorporated; Title: Details of DCI and SPS Configuration.
R2-166733; 3GPP TSG-RAN WG2 Meeting #95bis; Kaohsuing, Oct. 10-14, 2016; Agenda item: 8.13.3; Source: Qualcomm Incorporated; Title: V2P Services over PC5.
R2-166750; 3GPP TSG-RAN WG2 Meeting #95bis; Kaohsiung, Taiwan, Oct. 10-14, 2016; Agenda item: 8.13.1; Source: Nokia, Alcatel-Lucent Shanghai Bell;Title: MBMS Session Reception for V2X.
R2-166752; 3GPP TSG-RAN WG2 Meeting #95bis; Kaohsiung, Taiwan, Oct. 10-14, 2016; Agenda item: 8.13.3; Source: Nokia, Alcatel-Lucent Shanghai Bell; Title: Efficient V2P/P2V activation.
R2-166861; 3GPP TSG-RAN WG2 #95bis; Kaohsiung, Taiwan, Oct. 10-14, 2016; Agenda item: 8.13.3; Source: Kyocera; Title: Consideration of the P2V transmission scheme.
R2-166872; 3GPP TSG-RAN WG2 #95bis; Kaohsiung, Taiwan, Oct. 10-14, 2016; Agenda Item: 8.13.2; Source: Interdigital; Title: Details on SPS for V2X.
R2-166961; 3GPP TSG-RAN WG2 Meeting #95bis; Kaohsiung, Taiwan, Oct. 10-14, 2016; Title: Introducing Sidelink SPS in MAC; Source to WG: Ericsson;Source to TSG: R2.
R2-166962; 3GPP TSG-RAN WG2 Meeting #95bis; Kaohsiung, Taiwan, Oct. 10-14, 2016; Title: Introducing Sidelink SPS in RRC.
R2-166964; 3GPP TSG-RAN WG2 #95bis; Kaohsiung, Taiwan, Oct. 10-14, 2016; Agenda Item: 8.13.2; Source: Ericsson; Title: Configuration of UE Assistance Information.
R2-166967; 3GPP TSG-RAN WG2 #95bis; Kaohsiung, Taiwan, Oct. 10-14, 2016; Agenda Item: 8.13.3; Source: Ericsson; Title: Discussion on Sidelink Operations for Pedestrian.
R2-166975; 3GPP TSG-RAN WG2 #95bis; Kaohsiung, Taiwan, Oct. 10-14, 2016; Agenda Item: 8.13.2; Source: Ericsson (Rapporteur); Title: Report from [95#32][LTE/V2V] SPS.
R2-166976; 3GPP TSG-RAN WG2 #95bis; Kaohsiung, Taiwan, Oct. 10-14, 2016; Agenda Item: 8.13.2; Source: Ericsson; Title: Sidelink SPS Configuration.
R2-166977; 3GPP TSG-RAN WG2 #95bis; Kaohsiung, Taiwan, Oct. 10-14, 2016; Agenda Item: 8.13.2; Source: Ericsson; Title: SPS Protocol for Uu.
R2-166980; 3GPP TSG-RAN WG2 #95bis; Kaohsiung, Taiwan, Oct. 10-14, 2016; Title: [Draft] LS Reply on Multiple TMGIs for support of small and variable MBMS areas.
R2-166982; 3GPP TSG-RAN WG2 #95bis; Kaohsiung, Taiwan, Oct. 10-14, 2016; Agenda Item: 8.13.1; Source: Ericsson; Title: V2X Message Broadcasting.

(56) References Cited

OTHER PUBLICATIONS

R2-166983; 3GPP TSG-RAN WG2 #95bis; Kaohsiung, Taiwan, Oct. 10-14, 2016; Agenda Item: 8.13.1; Source: Ericsson; Title: On MBMS Latency.

* cited by examiner

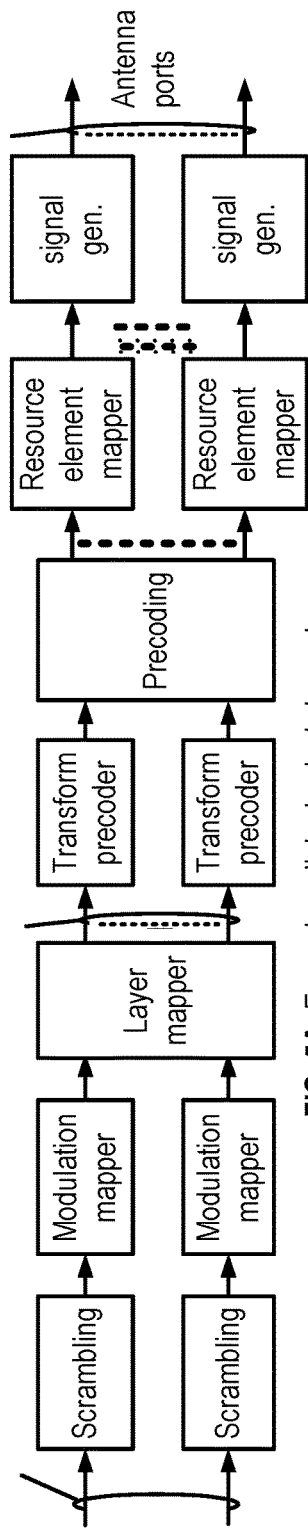
FIG. 5A Example uplink physical channel
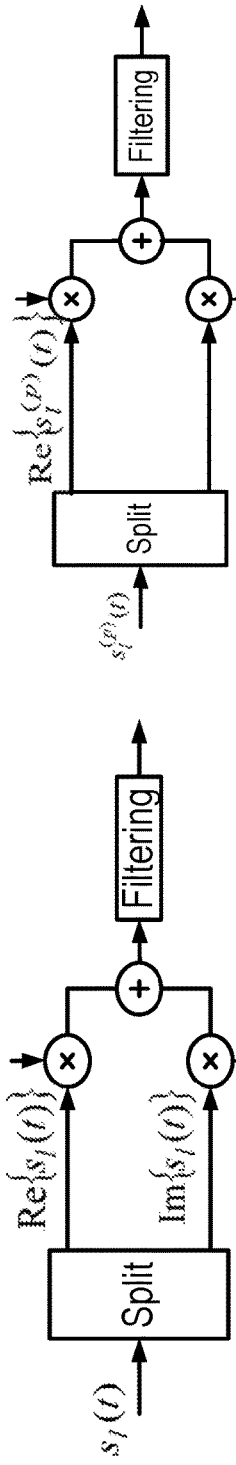
FIG. 5B Example uplink modulation
FIG. 5D Example downlink modulation
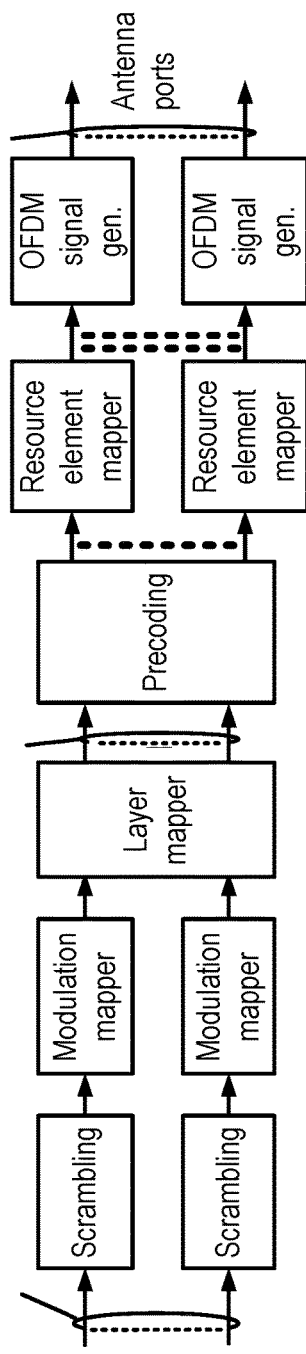
FIG. 5C Example downlink physical channel Dual-Connectivity at eNB FIG. 7 Dual-Connectivity- two MAC entities at UE side

SPS CONFIGURATION DURING HANDOVER

CROSS-REFERENCE TO RELATED APPLICATIONS

This application claims the benefit of U.S. Provisional Application No. 62/417,169, filed Nov. 3, 2016, which is hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present invention.

DETAILED DESCRIPTION OF EMBODIMENTS

Figure 1:
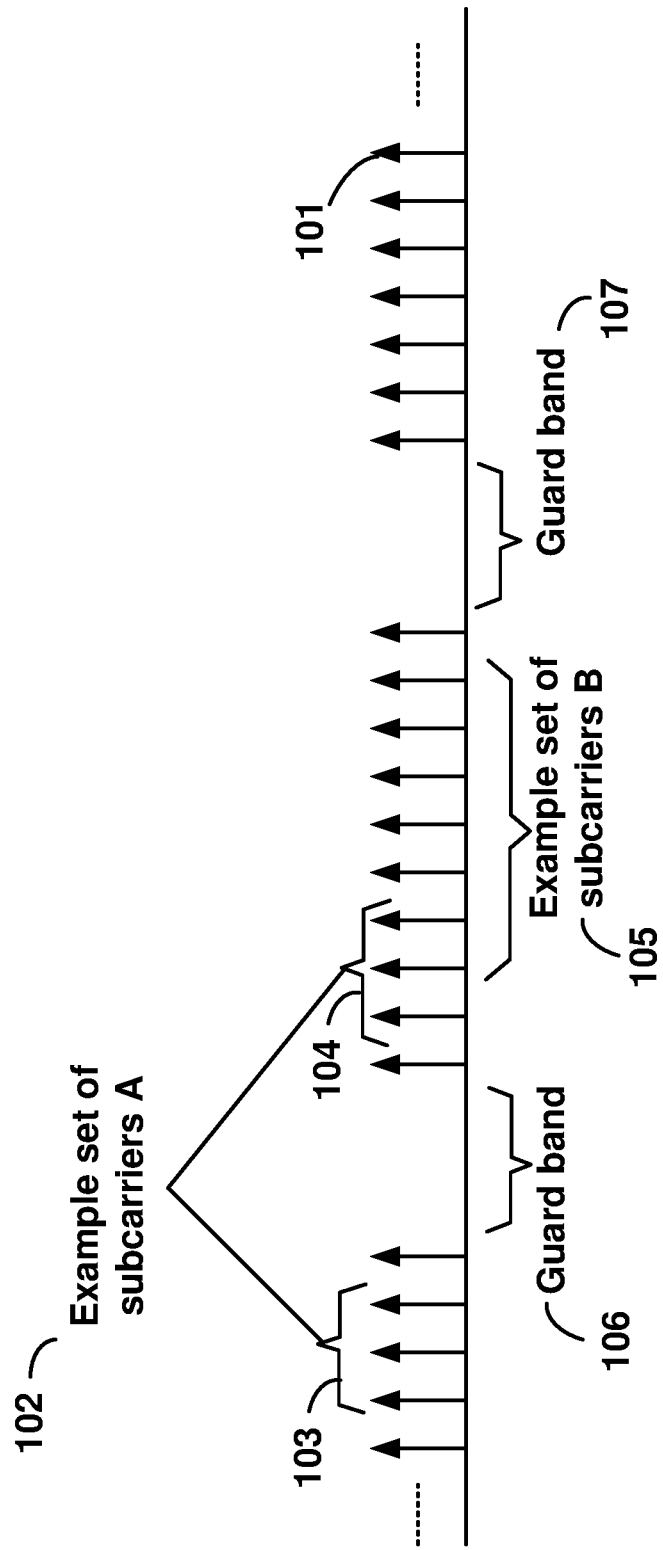
FIG. 1 is a diagram depicting example sets of OFDM subcarriers as per an aspect of an embodiment of the present invention.

Example embodiments of the present invention enable operation of carrier aggregation. Embodiments of the technology disclosed herein may be employed in the technical field of multicarrier communication systems. More particularly, the embodiments of the technology disclosed herein may relate to signal timing in multicarrier communication systems.

The following Acronyms are used throughout the present disclosure:

| Acronym | Definition |
| --- | --- |
| ASIC | application-specific integrated circuit |
| BPSK | binary phase shift keying |
| CA | carrier aggregation |
| CSI | channel state information |
| CDMA | code division multiple access |
| CSS | common search space |
| CPLD | complex programmable logic devices |
| CC | component carrier |
| DL | downlink |
| DCI | downlink control information |
| DC | dual connectivity |
| EPC | evolved packet core |
| E-UTRAN | evolved-universal terrestrial radio access network |
| FPGA | field programmable gate arrays |
| FDD | frequency division multiplexing |
| HDL | hardware description languages |
| HARQ | hybrid automatic repeat request |
| IE | information element |
| LTE | long term evolution |
| MCG | master cell group |
| MeNB | master evolved node B |
| MIB | master information block |
| MAC | media access control |
| MAC | media access control |
| MME | mobility management entity |
| NAS | non-access stratum |
| OFDM | orthogonal frequency division multiplexing |
| PDCP | packet data convergence protocol |
| PDU | packet data unit |
| PHY | physical |
| PDCCH | physical downlink control channel |
| PHICH | physical HARQ indicator channel |
| PUCCH | physical uplink control channel |
| PUSCH | physical uplink shared channel |
| PCell | primary cell |
| PCell | primary cell |
| PCC | primary component carrier |
| PSCell | primary secondary cell |
| pTAG | primary timing advance group |
| QAM | quadrature amplitude modulation |
| QPSK | quadrature phase shift keying |
| RBG | Resource Block Groups |
| RLC | radio link control |
| RRC | radio resource control |
| RA | random access |
| RB | resource blocks |
| SCC | secondary component carrier |
| SCell | secondary cell |
| Scell | secondary cells |
| SCG | secondary cell group |
| SeNB | secondary evolved node B |
| sTAGs | secondary timing advance group |
| SDU | service data unit |
| S-GW | serving gateway |
| SRB | signaling radio bearer |
| SC-OFDM | single carrier-OFDM |
| SFN | system frame number |
| SIB | system information block |
| TAI | tracking area identifier |
| TAT | time alignment timer |
| TDD | time division duplexing |
| TDMA | time division multiple access |
| TA | timing advance |
| TAG | timing advance group |
| TB | transport block |
| UL | uplink |
| UE | user equipment |
| VHDL | VHSIC hardware description language |

Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
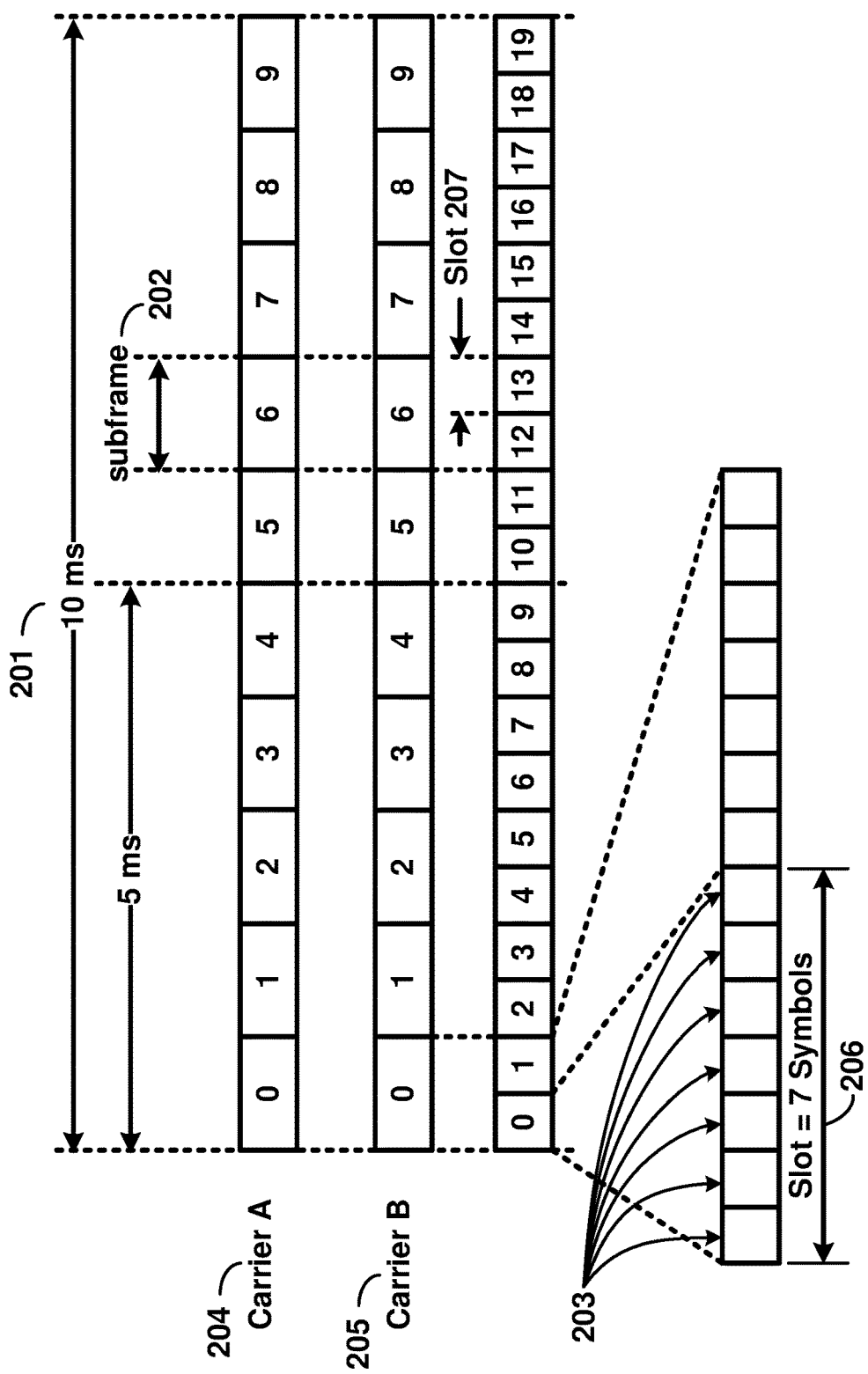
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
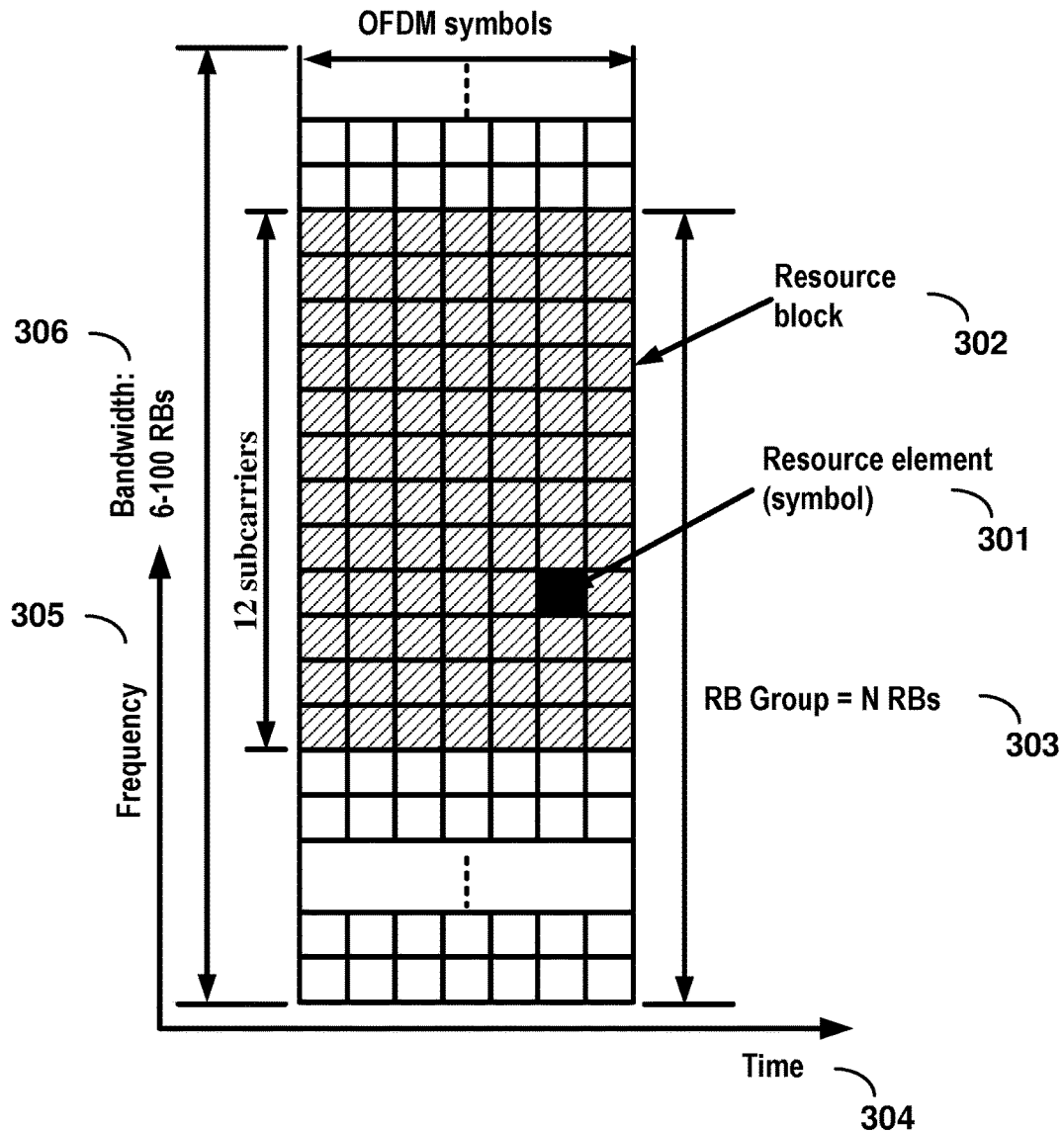
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
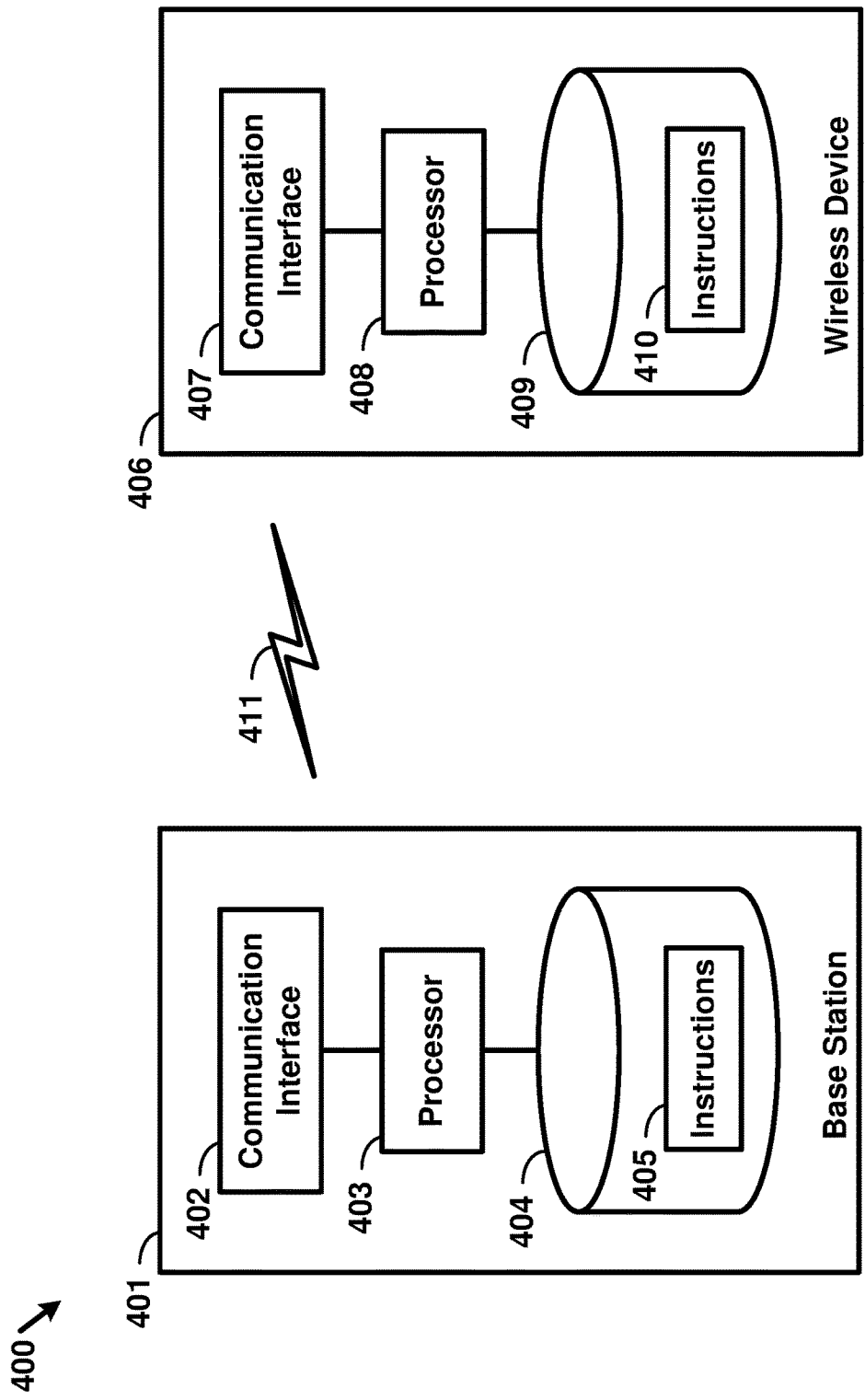
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, an LTE network may include a multitude of base stations, providing a user plane PDCP/RLC/MAC/PHY and control plane (RRC) protocol terminations towards the wireless device. The base station(s) may be interconnected with other base station(s) (e.g. employing an X2 interface). The base stations may also be connected employing, for example, an S1 interface to an EPC. For example, the base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
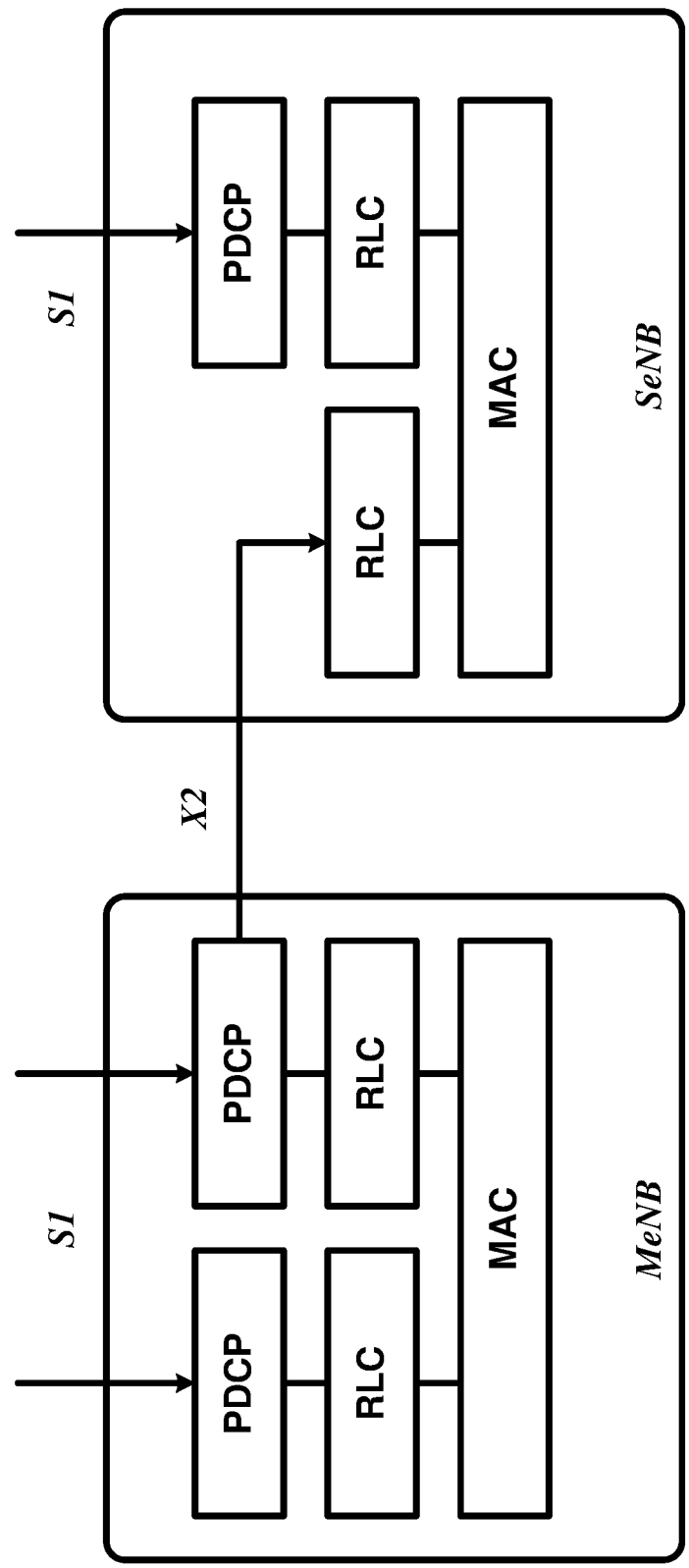
FIG. 6 is an example diagram for a protocol structure with CA and DC as per an aspect of an embodiment of the present invention.
Figure 7:
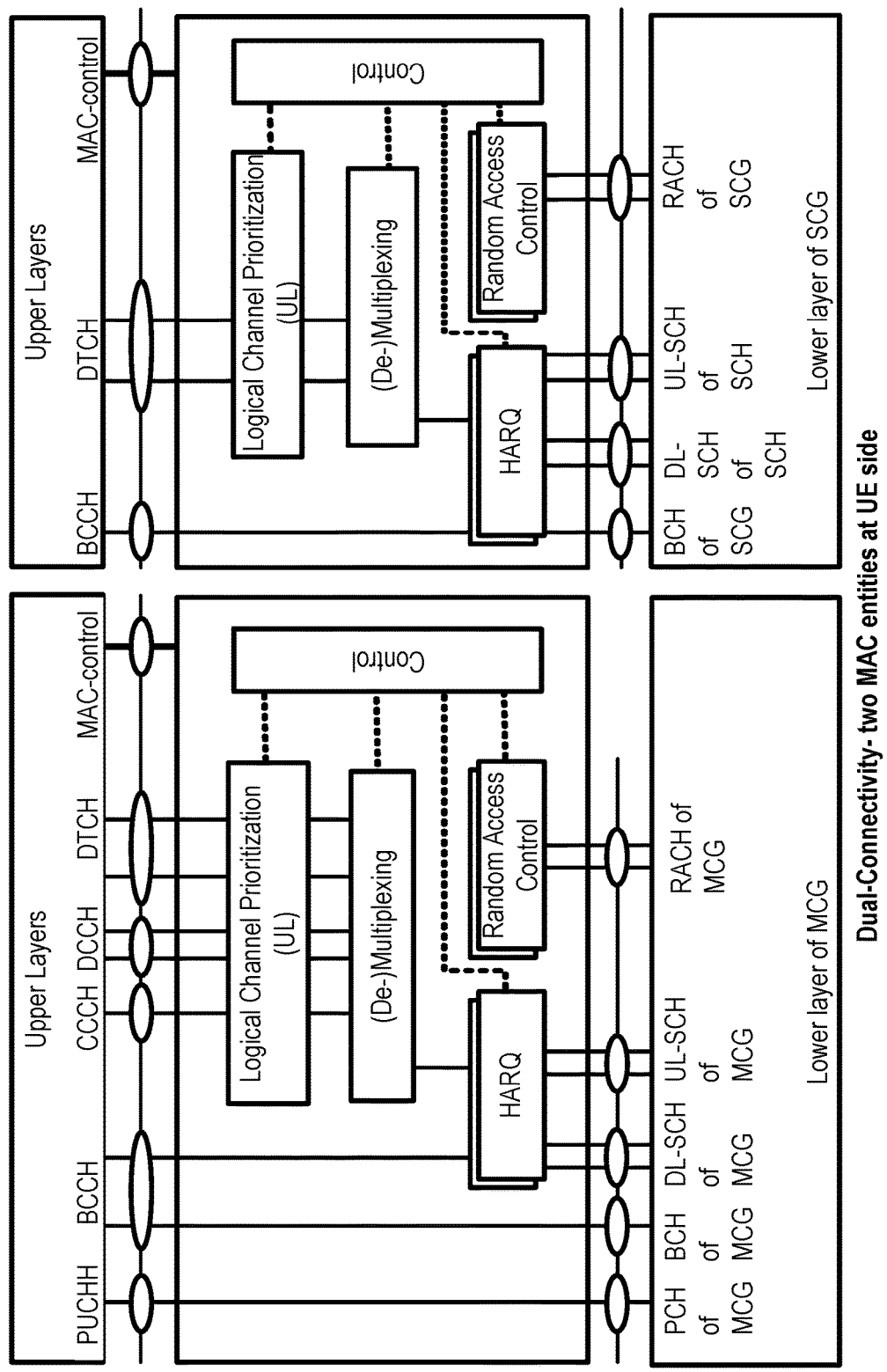
FIG. 7 is an example diagram for a protocol structure with CA and DC as per an aspect of an embodiment of the present invention.

FIG. 6 and FIG. 7 are example diagrams for protocol structure with CA and DC as per an aspect of an embodiment of the present invention. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the invention.

In the case of DC, the UE may be configured with two MAC entities: one MAC entity for MeNB, and one MAC entity for SeNB. In DC, the configured set of serving cells for a UE may comprise of two subsets: the Master Cell Group (MCG) containing the serving cells of the MeNB, and the Secondary Cell Group (SCG) containing the serving cells of the SeNB. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a MeNB may be informed by the UE of a SCG failure type, for split bearer, the DL data transfer over the MeNB is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a MeNB and a SeNB, one or more of the following principles may be applied: the MeNB may maintain the RRM measurement configuration of the UE and may, (e.g., based on received measurement reports or traffic conditions or bearer types), decide to ask a SeNB to provide additional resources (serving cells) for a UE; upon receiving a request from the MeNB, a SeNB may create a container that may result in the configuration of additional serving cells for the UE (or decide that it has no resource available to do so); for UE capability coordination, the MeNB may provide (part of) the AS configuration and the UE capabilities to the SeNB; the MeNB and the SeNB may exchange information about a UE configuration by employing of RRC containers (inter-node messages) carried in X2 messages; the SeNB may initiate a reconfiguration of its existing serving cells (e.g., PUCCH towards the SeNB); the SeNB may decide which cell is the PSCell within the SCG; the MeNB may not change the content of the RRC configuration provided by the SeNB; in the case of a SCG addition and a SCG SCell addition, the MeNB may provide the latest measurement results for the SCG cell(s); both a MeNB and a SeNB may know the SFN and subframe offset of each other by OAM, (e.g., for the purpose of DRX alignment and identification of a measurement gap). In an example, when adding a new SCG SCell, dedicated RRC signalling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

Figure 8:
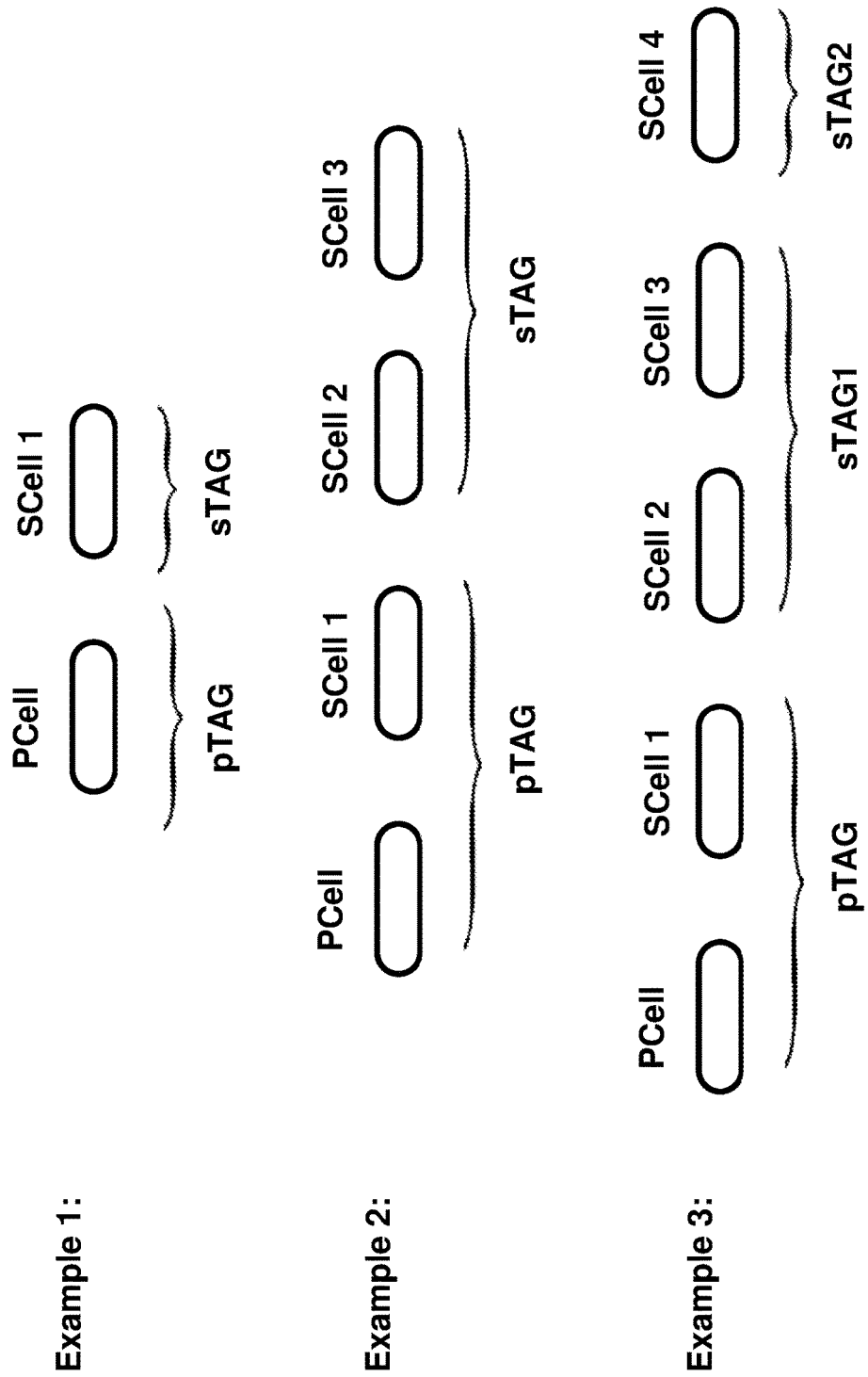
FIG. 8 shows example TAG configurations as per an aspect of an embodiment of the present invention.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
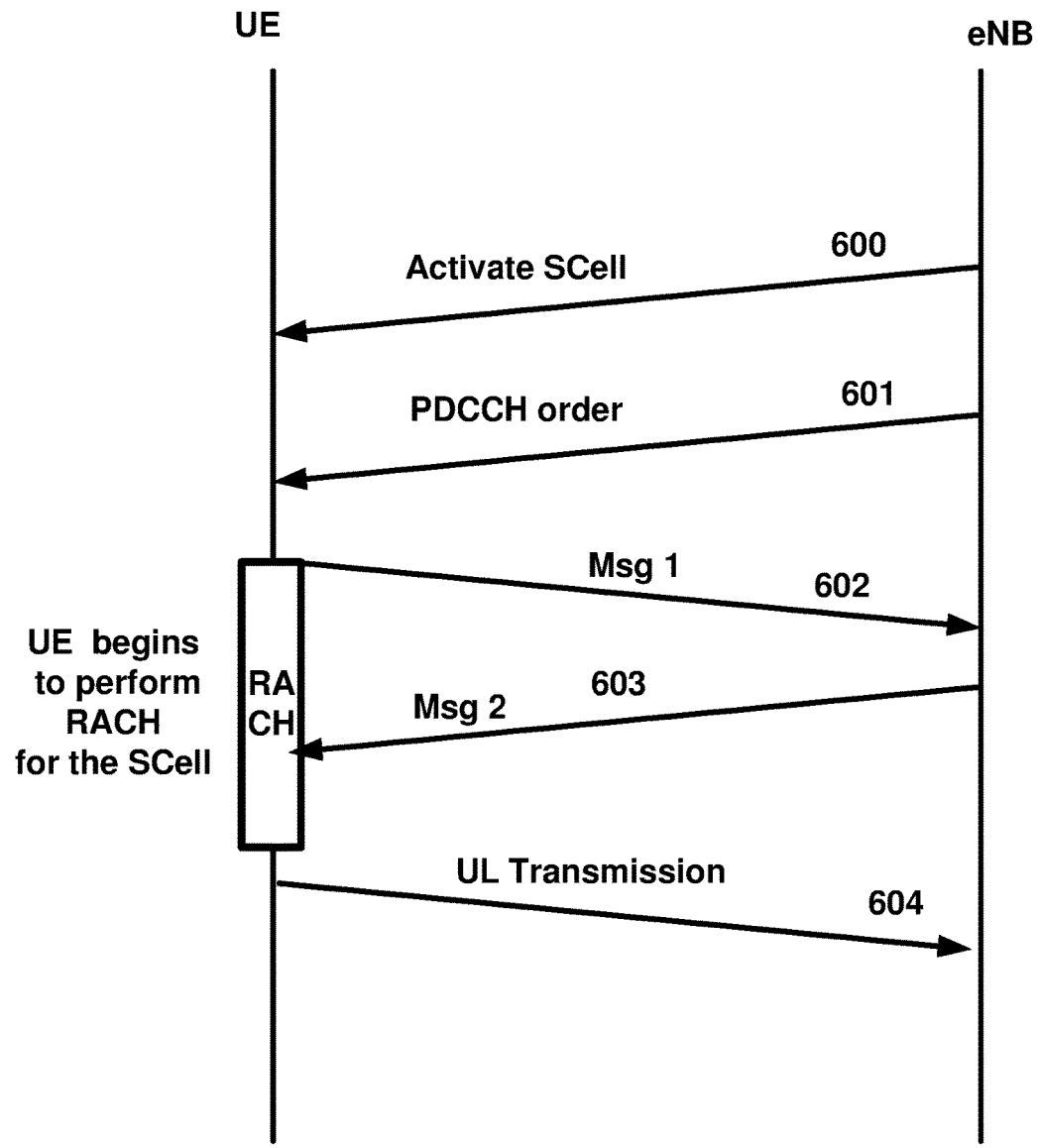
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the invention may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may be performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

Figure 13:
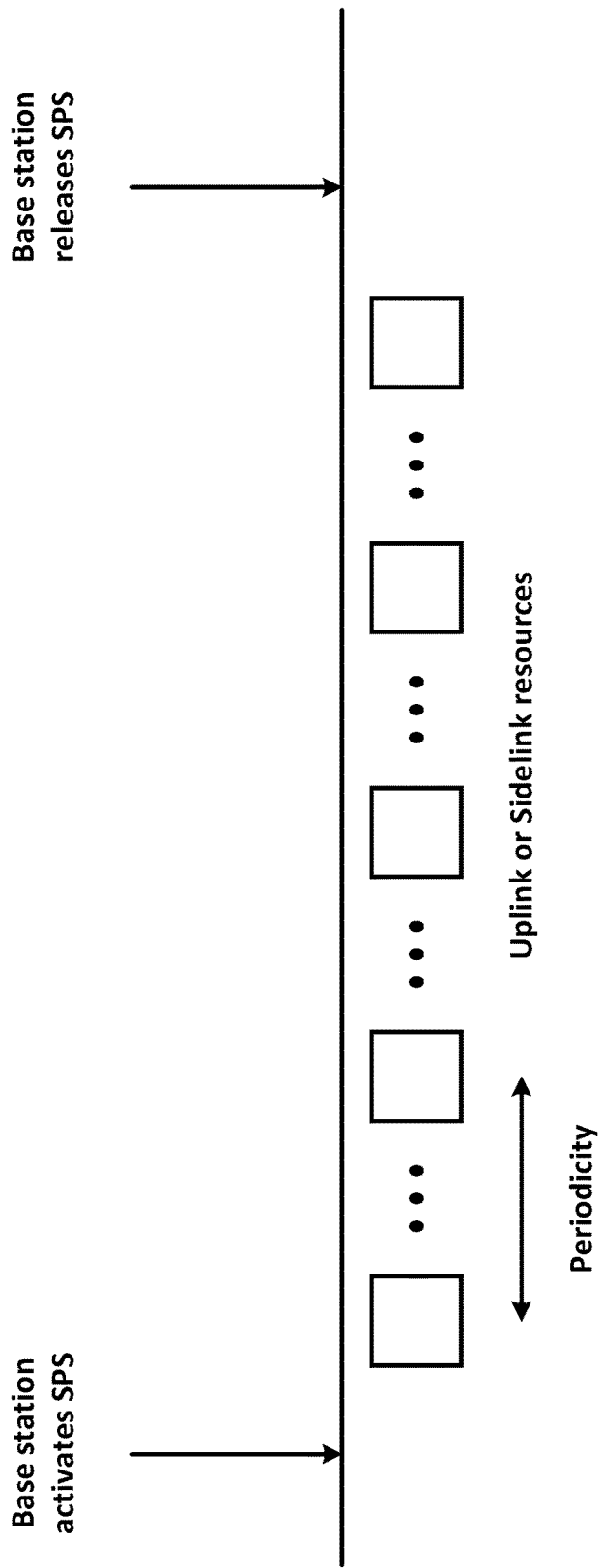
FIG. 13 is a block diagram illustrating an example SPS radio resource configuration and activation as per an aspect of embodiments of the present disclosure.

In an example, in FIG. 13, semi-persistent scheduling (SPS) configuration may be employed to assign uplink and/or sidelink resources for periodic traffic of a UE. By assigning periodic resources with SPS configuration, a UE may not need to request uplink and/or sidelink resources to a base station whenever packets of periodic traffic are generated. The SPS configuration may reduce signaling between a base station and a wireless device for resource allocation if traffic of the wireless device is periodic. The SPS configuration may comprise periodicity information of allocated radio resources.

In an example, a base station may assign SPS radio resources via a radio resource control (RRC) message to a wireless device. One or more parameters of the RRC message may comprise a periodicity of the SPS radio resources. The base station may activate the SPS radio resources assigned via the RRC message by transmitting a DCI activation indication to the wireless device. The wireless device may be able to use the SPS radio resources periodically after k time duration from the DCI activation indication without further resource allocation request until the SPS radio resources are deactivated.

In an example embodiment, various DCI formats may be used for SPS scheduling. For example, the DCI format 0 may be used for uplink SPS. In an example, the fields for DCI format 0 may comprise one or more of the following fields:

Carrier indicator—0 or 3 bits.

Flag for format0/format1A differentiation—1 bit, where value 0 may indicate format 0 and value 1 may indicate format 1A.

Frequency hopping flag—1 bit. This field may be used as the MSB of the corresponding resource allocation field for resource allocation type 1.

Resource block assignment and hopping resource allocation—$\lceil \log_2 (N_{RB}^{UL} (N_{RB}^{UL}+1)/2) \rceil$ bits where $N_{RB}^{UL}$ may be the uplink bandwidth configuration in number of resource blocks.

Modulation and coding scheme and redundancy version—5 bits

New data indicator—1 bit

TPC command for scheduled PUSCH—2 bits

Cyclic shift for DM RS and OCC index—3 bits

UL index—2 bits (this field may be present only for TDD operation with uplink-downlink configuration 0)

Downlink Assignment Index (DAI)—2 bits (this field may be present only for cases with TDD primary cell and either TDD operation with uplink-downlink configurations 1-6 or FDD operation)

CSI request—1, 2 or 3 bits. The 2-bit field may apply to UEs configured with no more than five DL cells and to UEs that are configured with more than one DL cell and when the corresponding DCI format is mapped onto the UE specific search space given by the C-RNTI, UEs that are configured by higher layers with more than one CSI process and when the corresponding DCI format is mapped onto the UE specific search space given by the C-RNTI, UEs that are configured with two CSI measurement sets by higher layers with the parameter csi-MeasSubframeSet, and when the corresponding DCI format is mapped onto the UE specific search space given by the C-RNTI; the 3-bit field may apply to the UEs that are configured with more than five DL cells and when the corresponding DCI format is mapped onto the UE specific search space given by the C-RNTI; otherwise the 1-bit field applies SRS request—0 or 1 bit. This field may only be present in DCI formats scheduling PUSCH which are mapped onto the UE specific search space given by the C-RNTI.

Resource allocation type—1 bit. This field may only be present if $N_{RB}^{UL} \leq N_{RB}^{DL}$ where $N_{RB}^{UL}$ may be the uplink bandwidth configuration in number of resource blocks and $N_{RB}^{DL}$ may be the downlink bandwidth configuration in number of resource blocks.

If the number of information bits in format 0 mapped onto a given search space is less than the payload size of format 1A for scheduling the same serving cell and mapped onto the same search space (including any padding bits appended to format 1A), zeros may be appended to format 0 until the payload size equals that of format 1A.

A UE may validate a Semi-Persistent Scheduling assignment PDCCH if all the following conditions are met: the CRC parity bits obtained for the PDCCH payload are scrambled with the Semi-Persistent Scheduling C-RNTI; and the new data indicator field is set to '0'. In case of DCI formats 2, 2A, 2B, 2C and 2D, the new data indicator field may refer to the one for the enabled transport block.

A UE may validate a Semi-Persistent Scheduling assignment EPDCCH if all the following conditions are met: the CRC parity bits obtained for the EPDCCH payload are scrambled with the Semi-Persistent Scheduling C-RNTI; and the new data indicator field is set to '0'. In case of DCI formats 2, 2A, 2B, 2C and 2D, the new data indicator field may refer to the one for the enabled transport block.

Validation may be achieved if the fields for the respective used DCI format are set according to various values. For example, if validation is achieved, the UE may consider the received DCI information accordingly as a valid semi-persistent activation or release. If validation is not achieved, the received DCI format may be considered by the UE as having been received with a non-matching CRC.

For the case that the DCI format indicates a semi-persistent downlink scheduling activation, the TPC command for PUCCH field may be used as an index to one of the four PUCCH resource values configured by higher layers, with the mapping defined as followings. If a value of TPC command for PUCCH is '00', the first PUCCH resource value may be configured by the higher layers. If a value of TPC command for PUCCH is '01', the second PUCCH resource value may be configured by the higher layers. If a value of TPC command for PUCCH is '10', the third PUCCH resource value may be configured by the higher layers. If a value of TPC command for PUCCH is '11', the fourth PUCCH resource value may be configured by the higher layers.

In an example, the information element SPS-Config may be used by RRC to specify the semi-persistent scheduling configuration.

In an example, multiple downlink or uplink SPS may be configured for a cell. In an example, multiple SPS RNTI may be configured when a plurality of SPS is configured. In an example, RRC may comprise an index identifying an SPS configuration for a cell. In an example, the DCI employing SPS RNTI and triggering an SPS may include the index of the SPS that is triggered (initialized) or released.

In an example, SPS configuration may include MCS employed for packet transmission of an MCS grant. In an example, implicitReleaseAfter may be the number of empty transmissions before implicit release. Value e2 may corresponds to 2 transmissions, e3 may correspond to 3 transmissions and so on. In an example, n1PUCCH-AN-PersistentList, n1PUCCH-AN-PersistentListP1 may be the List of parameter: $n_{PUCCH}^{(1,p)}$ for antenna port P0 and for antenna port P1 respectively. Field n1-PUCCH-AN-PersistentListP1 may be applicable only if the twoAntennaPortActivated-PUCCH-Format1a1b in PUCCH-ConfigDedicated-v1020 is set to true. Otherwise the field may not be configured. In an example, numberOfConfSPS-Processes may be the number of configured HARQ processes for Semi-Persistent Scheduling.

In an example, p0-NominalPUSCH-Persistent may be the parameter: $P_{O\_NOMINAL\_PUSCH}(0)$ used in PUSCH power control with unit in dBm and step 1. This field may be applicable for persistent scheduling. If choice setup is used and p0-Persistent is absent, the value of p0-NominalPUSCH for p0-NominalPUSCH-Persistent may be applied. If uplink power control subframe sets are configured by tpc-SubframeSet, this field may apply for uplink power control subframe set 1.

In an example, p0-NominalPUSCH-PersistentSubframeSet2 may be the parameter: $P_{O\_NOMINAL\_PUSCH}(0)$ used in PUSCH power control with unit in dBm and step 1. This field may be applicable for persistent scheduling, only. If p0-PersistentSubframeSet2-r12 is not configured, the value of p0-NominalPUSCH-SubframeSet2-r12 may be applied for p0-NominalPUSCH-PersistentSubframeSet2.

E-UTRAN may configure this field only if uplink power control subframe sets are configured by tpc-SubframeSet, in which case this field may apply for uplink power control subframe set 2.

In an example, p0-UE-PUSCH-Persistent may be the parameter: $P_{O\_UE\_PUSCH}(0)$ used in PUSCH power control with unit in dB. This field may be applicable for persistent scheduling, only. If choice setup is used and p0-Persistent is absent, the value of p0-UE-PUSCH may be applied for p0-UE-PUSCH-Persistent. If uplink power control subframe sets are configured by tpc-SubframeSet, this field may be applied for uplink power control subframe set 1.

In an example, p0-UE-PUSCH-PersistentSubframeSet2 may be the parameter: $P_{O\_UE\_PUSCH}(0)$ used in PUSCH power control with unit in dB. This field may be applicable for persistent scheduling, only. If p0-PersistentSubframe-Set2-r12 is not configured, the value of p0-UE-PUSCH-SubframeSet2 may be applied for p0-UE-PUSCH-PersistentSubframeSet2. E-UTRAN may configure this field only if uplink power control subframe sets are configured by tpc-SubframeSet, in which case this field may apply for uplink power control subframe set 2.

In an example, semiPersistSchedC-RNTI may be Semi-Persistent Scheduling C-RNTI. In an example, semiPersist-SchedIntervalDL may be Semi-persistent scheduling interval in downlink. Its value may be in number of sub-frames. Value sf10 may correspond to 10 sub-frames, sf20 may correspond to 20 sub-frames and so on. For TDD, the UE may round this parameter down to the nearest integer (of 10 sub-frames), e.g. sf10 may correspond to 10 sub-frames, sf32 may correspond to 30 sub-frames, sf128 may correspond to 120 sub-frames.

In an example, semiPersistSchedIntervalUL may be semi-persistent scheduling interval in uplink. Its value in number of sub-frames. Value sf10 may correspond to 10 sub-frames, sf20 may correspond to 20 sub-frames and so on. For TDD, the UE may round this parameter down to the nearest integer (of 10 sub-frames), e.g. sf10 may correspond to 10 sub-frames, sf32 may correspond to 30 sub-frames, sf128 may correspond to 120 sub-frames. In an example, twoIntervalsConfig may be trigger of two-intervals-Semi-Persistent Scheduling in uplink. If this field is present, two-intervals-SPS is enabled for uplink. Otherwise, two-intervals-SPS is disabled.

In an example, when Semi-Persistent Scheduling is enabled by RRC, the information such as, for example, may be provided: Semi-Persistent Scheduling C-RNTI; Uplink Semi-Persistent Scheduling interval semiPersistSchedIntervalUL and number of empty transmissions before implicit release implicitReleaseAfter, if Semi-Persistent Scheduling is enabled for the uplink; Whether twoIntervalsConfig is enabled or disabled for uplink, only for TDD; and Downlink Semi-Persistent Scheduling interval semiPersistSchedIntervalDL and number of configured HARQ processes for Semi-Persistent Scheduling numberOfConfSPS-Processes, if Semi-Persistent Scheduling is enabled for the downlink.

In an example, when Semi-Persistent Scheduling for uplink or downlink is disabled by RRC, the corresponding configured grant or configured assignment may be discarded.

In an example, Semi-Persistent Scheduling may be supported on the SpCell in release 13 LTE. In an example, Semi-Persistent Scheduling may not be supported for RN communication with the E-UTRAN in combination with an RN subframe configuration.

In an example, when eIMTA is configured for the SpCell, if a configured uplink grant or a configured downlink assignment occurs on a subframe that can be reconfigured through eIMTA L1 signalling, the UE behavior may be left unspecified.

In an example, after a Semi-Persistent downlink assignment is configured, the MAC entity may consider sequentially that the Nth assignment occurs in the subframe for which: (10*SFN+subframe)=[(10*SFNstart time+subframestart time)+N*semiPersistSchedIntervalDL] modulo 10240, where SFNstart time and subframestart time may be the SFN and subframe, respectively, at the time the configured downlink assignment was (re-)initialized.

In an example, after a Semi-Persistent Scheduling uplink grant is configured, the MAC entity may: if twoIntervalsConfig is enabled by upper layer: set the Subframe_Offset according to Table below. else: set Subframe_Offset to 0.

In an example, it may be considered sequentially that the Nth grant occurs in the subframe for which: (10*SFN+subframe)=[(10*SFNstart time+subframestart time)+N*semiPersistSchedIntervalUL+Subframe_Offset*(N modulo 2)] modulo 10240, where SFNstart time and subframestart time may be the SFN and subframe, respectively, at the time the configured uplink grant was (re-)initialised.

In an example, subframe_offset values may be configured with three fields: TDD UL/DL configuration, Position of initial Semi-Persistent grant, and/or subframe-offset value (ms). In an example, different configurations for the three fields may be defined, e.g. (0, N/A, 0), (1, Subframes 2 and 7, 1), (1, Subframes 3 and 8, −1), (2, Subframe 2, 5), (2, Subframe 7, −5), (3, Subframes 2 and 3, 1), (3, Subframe 4, −2), (4, Subframe 2, 1), (4, Subframe 3, −1), (5, N/A, 0), and (6, N/A, 0).

In an example, the MAC entity may clear the configured uplink grant immediately after implicitReleaseAfter number of consecutive new MAC PDUs containing zero MAC SDUs have been provided by the Multiplexing and Assembly entity, on the Semi-Persistent Scheduling resource. Retransmissions for Semi-Persistent Scheduling may continue after clearing the configured uplink grant. In an example, the IE MAC-MainConfig may be used to specify the MAC main configuration for signalling and data radio bearers. In an example, the MAC main configuration parameters may be configured independently per Cell Group (e.g., MCG or SCG), unless explicitly specified otherwise.

In an example, MAC-MainConfig information element may be configured.

In an example, dl-PathlossChange may indicate DL Pathloss Change and the change of the required power backoff due to power management (as allowed by P-MPRc) for PHR reporting. Its value may be in dB. Value dB1 may correspond to 1 dB, dB3 may correspond to 3 dB and so on. The same value may apply for serving cell (although the associated functionality may be performed independently for cell).

In an example, drx-Config may be used to configure DRX. E-UTRAN may configure the values in DRX-Config-v1130 only if the UE indicates support for IDC indication. E-UTRAN may configure drx-Config-v1130, drx-Config-v1310 and drx-Config-r13 if drx-Config (without suffix) is configured. E-UTRAN may configure drx-Config-r13 only if UE supports CE.

In an example, drx-InactivityTimer may be a timer for DRX. Its value may be in number of PDCCH sub-frames. Value psf1 may correspond to 1 PDCCH sub-frame, psf2 may correspond to 2 PDCCH sub-frames and so on.

In an example, drx-RetransmissionTimer may be a timer for DRX. Its value may be in number of PDCCH sub-frames. Value psf1 may correspond to 1 PDCCH sub-frame, psf2 may correspond to 2 PDCCH sub-frames and so on. In case drx-RetransmissionTimer-v1130 or drx-RetransmissionTimer-v1310 is signalled, the UE may ignore drx-RetransmissionTimer (e.g. without suffix).

In an example, drx-ULRetransmissionTimer may be a timer for DRX. Its value may be in number of PDCCH sub-frames. Value psf0 may correspond to no retransmission timer, value psf1 may correspond to 1 PDCCH sub-frame, psf2 may correspond to 2 PDCCH sub-frames and so on.

In an example, drxShortCycleTimer may be a timer for DRX. Its value may be in multiples of shortDRX-Cycle. A value of 1 may correspond to shortDRX-Cycle, a value of 2 may corresponds to 2*shortDRX-Cycle and so on.

In an example, dualConnectivityPHR may indicate if power headroom may be reported using Dual Connectivity Power Headroom Report MAC Control Element. If PHR functionality and dual connectivity are configured, E-UTRAN may configure the value setup for this field and configures phr-Config and dualConnectivityPHR for both CGs.

In an example, e-HARQ-Pattern may be configured. In an example, TRUE may indicate that enhanced HARQ pattern for TTI bundling is enabled for FDD. E-UTRAN may enable this field only when ttiBundling is set to TRUE. eDRX-Config-CycleStartOffset may indicate longDRX-Cycle and drxStartOffset. The value of longDRX-Cycle may be in number of sub-frames. The value of drxStartOffset, in number of subframes, may be indicated by the value of eDRX-Config-CycleStartOffset multiplied by 2560 plus the offset value configured in longDRX-CycleStartOffset. E-UTRAN may only configure value setup when the value in longDRX-CycleStartOffset is sf2560.

In an example, extendedBSR-Sizes may be configured. If value setup is configured, the BSR index may indicate extended BSR size levels. extendedPHR may indicate if power headroom may be reported using the Extended Power Headroom Report MAC control element. E-UTRAN may configure the value setup if more than one and up to eight Serving Cell(s) with uplink is configured and none of the serving cells with uplink configured has a servingCellIndex higher than seven and if PUCCH on SCell is not configured and if dual connectivity is not configured. E-UTRAN may configure extendedPHR if phr-Config is configured. The UE may release extendedPHR if phr-Config is released.

In an example, extendedPHR2 may indicate if power headroom may be reported using the Extended Power Headeroom Report 2 MAC Control Element (value setup). E-UTRAN may configure the value setup if any of the serving cells with uplink configured has a servingCellIndex higher than seven or if PUCCH SCell (with any number of serving cells with uplink configured) is configured. E-UTRAN may configure extendedPHR2 if phr-Config is configured. The UE may release extendedPHR2 if phr-Config is released.

In an example, logicalChannelSR-ProhibitTimer timer may be used to delay the transmission of an SR for logical channels enabled by logicalChannelSR-Prohibit. Value sf20 may correspond to 20 subframes, sf40 may correspond to 40 subframes, and so on.

In an example, longDRX-CycleStartOffset may be longDRX-Cycle and drxStartOffset unless eDRX-Config-CycleStartOffset is configured. The value of longDRX-Cycle may be in number of sub-frames. Value sf10 may correspond to 10 sub-frames, sf20 may correspond to 20 sub-frames and so on. If shortDRX-Cycle is configured, the value of longDRX-Cycle may be a multiple of the short-DRX-Cycle value. The value of drxStartOffset may be in number of sub-frames. In case longDRX-CycleStartOffset-v1130 is signalled, the UE may ignore longDRX-CycleStartOffset (e.g., without suffix).

In an example, maxHARQ-Tx may be the maximum number of transmissions for UL HARQ.

In an example, onDurationTimer may be a timer for DRX. Its value may be in number of PDCCH sub-frames. Value psf1 may correspond to 1 PDCCH sub-frame, psf2 may correspond to 2 PDCCH sub-frames and so on. In case onDurationTimer-v1310 is signalled, the UE may ignore onDurationTimer (e.g. without suffix).

In an example, periodicBSR-Timer may be a timer for BSR reporting. Its value may be in number of sub-frames. Value sf10 may correspond to 10 sub-frames, sf20 corresponds to 20 sub-frames and so on. In an example, periodicPHR-Timer timer may be for PHR reporting. Its value may be in number of sub-frames. Value sf10 may correspond to 10 subframes, sf20 may correspond to 20 subframes and so on. In an example, phr-ModeOtherCG may indicate the mode (e.g. real or virtual) used for the PHR of the activated cells that are part of the other Cell Group (e.g. MCG or SCG), when DC is configured.

In an example, prohibitPHR-Timer timer may be for PHR reporting. Its value may be in number of sub-frames. Value sf0 may correspond to 0 subframes, sf100 may correspond to 100 subframes and so on. In an example, retxBSR-Timer timer may be for BSR reporting. Its value may be in number of sub-frames. Value sf640 may corresponds to 640 sub-frames, sf1280 may correspond to 1280 sub-frames and so on. In an example, sCellDeactivationTimer may be SCell deactivation timer. Its value may be in number of radio frames. Value rf4 may correspond to 4 radio frames, value rf8 may correspond to 8 radio frames and so on. Other values of deactivation timer values may be supported, for example, 512, 1024 subframes. E-UTRAN may configure the field if the UE is configured with one or more SCells other than the PSCell and PUCCH SCell. If the field is absent, the UE may delete any existing value for this field and assume the value to be set to infinity. The same value may apply for SCell of a Cell Group (e.g. MCG or SCG) (although the associated functionality may be performed independently for SCell). Field sCellDeactivationTimer may not apply for the PUCCH SCell.

In an example, shortDRX-Cycle may be short DRX cycle. Its value may be in number of sub-frames. Value sf2 may correspond to 2 sub-frames, sf5 may correspond to 5 sub-frames and so on. In case shortDRX-Cycle-v1130 is signalled, the UE may ignore shortDRX-Cycle (e.g. without suffix). Short DRX cycle may not be configured for UEs in CE.

In an example, sr-ProhibitTimer may be timer for SR transmission on PUCCH. Its value may be in number of SR period(s) of shortest SR period of any serving cell with PUCCH. Value 0 may mean no timer for SR transmission on PUCCH is configured. Value 1 may correspond to one SR period, Value 2 may correspond to 2*SR periods and so on.

In an example, stag-Id may indicate the TAG of an SCell. It may Uniquely identify the TAG within the scope of a Cell Group (e.g., MCG or SCG). If the field is not configured for an SCell (e.g. absent in MAC-MainConfigSCell), the SCell may be part of the PTAG.

In an example, stag-ToAddModList, stag-ToReleaseList may be used to configure one or more STAGs. E-UTRAN may ensure that a STAG contains at least one SCell with configured uplink. If, due to SCell release a reconfiguration would result in an 'empty' TAG, E-UTRAN may include release of the concerned TAG. A timeAlignmentTimerSTAG may indicate the value of the time alignment timer for an STAG.

In an example, ttiBundling may be configured. TRUE may indicate that TTI bundling is enabled while FALSE may indicate that TTI bundling is disabled. TTI bundling may be enabled for FDD and for TDD for configurations 0, 1 and 6. The functionality may be performed independently per Cell Group (e.g., MCG or SCG). E-UTRAN may not configure TTI bundling for the SCG. For a TDD PCell, E-UTRAN may not simultaneously enable TTI bundling and semi-persistent scheduling in this release of the specification. For a Cell Group, E-UTRAN may not simultaneously configure TTI bundling and SCells with configured uplink, and E-UTRAN may not simultaneously configure TTI bundling and eIMTA.

In an example, a UE may be configured with semi-persistent scheduling on a secondary cell. The eNB may activate semi-persistent scheduling on a secondary cell by sending a PDCCH with semi-persistent scheduling downlink assignment or semi-persistent scheduling uplink grant on the secondary cell or on a serving cell scheduling the secondary cell.

In an example, a maximum of one downlink SPS and/or one uplink SPS may be configured for the PCell. Configuration of multiple SPSs are not supported for the PCell or any other cell. An SPS C-RNTI is configured for the UE to support one DL SPS configuration and/or one UL SPS configuration.

In an example, SPS configurations may be used for transmission of various V2X traffic and/or voice traffic by a UE. In an example, a UE supporting V2X may need to support multiple uplink SPS configurations for transmitting various periodic (or semi-periodic) traffic and/or voice traffic in the uplink. Other examples may be provided. For example, CAM messages in V2X may be semi-periodic. In some scenarios, CAM message generation may be dynamic in terms of size, periodicity and timing. Such changes may result in misalignment between SPS timing and CAM timing. There may be some regularity in size and periodicity between different triggers. Enhanced SPS mechanisms may be beneficial to transmit V2X traffic, voice traffic, and/or the like. In an example, various SPS periodicity, for example 100 ms and 1s may be configured.

In an example, multiple SPS configurations may be configured for UU and/or PC5 interface. An eNB may configure multiple SPS configurations for a given UE. In an example, SPS configuration specific MCS (e.g. MCS as a part of the RRC SPS-configuration) and/or SPS-configuration-specific periodicity may be configured. Some of the SPS configuration parameters may be the same across multiple SPS and some other SPS configuration parameters may be different across SPS configurations. The eNB may dynamically trigger/release the different SPS-configurations employing (E)PDCCH DCIs. In an example, the multiple SPS configurations may be indicated by eNB RRC signaling. The dynamical triggering and releasing may be performed by eNB transmitting (E)PDCCH DCI to the UE employing SPS C-RNTI.

In an example embodiment, a UE may indicate to an eNB that the UE does not intend and/or intend to transmit data before a transmission associated to an SPS configuration. The eNB may acknowledge the UE indication.

In an example, an eNB may provide one or more SPS configurations for the UE via RRC signaling. When the UE to start transmitting a type of message employing SPS, the UE may report information about the message to the eNB, e.g. message type, logical channel, traffic size, SPS index, and/or traffic type, etc. The eNB may transmit an SPS transmission grant based on the report and provide an SPS grant for a configuration and radio resources. After receiving the grant, the UE may initialize the corresponding SPS configuration and may transmit the data via the radio resources allocated to the UE.

In an example, multiple SPSs may be active in parallel. For example, a new service may be triggered while the previous service is on-going. In an example, the UE may indicate the new messages to the serving eNB. The eNB may provide another transmission grant for the new service/message(s). The UE may choose another SPS configuration and select the resources. In an example, the previous SPS grant and the new SPS grant may continue in parallel.

In an example, SPS may be employed for the transmission of BSM, DENMs and CAMs. For example, the UE's speed/position/direction changes within a range. BSM may be periodic traffic with a period of 100 ms. The message size of BSM may be in the range of 132~300 Bytes without certificate and 241-409 Bytes with certificate. DENMs, once triggered, may be transmitted periodically with a given message period which may remain unchanged. The message size of the DENM may be 200~1200 Bytes. If the UE's speed/position/direction does not change or only changes within a small range, the CAM generation periodicity may be fixed.

In an example, the SPS may be supported for the UL and DL VoIP transmission. In the current SPS specification, the eNodeB may configure SPS periodicity via dedicated RRC signaling. The periodicity of VoIP packet is generally fixed. The UE may transmit multiple V2X services, which may require different periodicity and packet sizes. The SPS TB size and period may be adapted to different V2X services. Multiple parallel SPS processes may be activated at the UE. The SPS processes may differ in the amount of resource blocks (RBs) allocated and/or SPS period and may correspond to different types of V2X packets. Once the AS layer of UE receives the V2X packets from upper layer, the UE may trigger V2X packet transmissions on the corresponding SPS grant. Multiple UL SPS configurations may be configured for the UE.

In an example, the eNB may configure different SPS C-RNTIs for different SPS processes of the UE. The legacy SPS activation and release mechanism may be reused. Based on the different SPS C-RNTIs, the eNB may trigger which SPS process is activated or released. In an example implementation, in order to support multiple SPS configurations a different SPS C-RNTI may be configured for different SPS traffic. For example, a first SPS C-RNTI may be configured for SPS configuration to transmit voice traffic, a second SPS C-RNTI may be configured for SPS configuration to transmit a V2X traffic. An eNB may transmit one or more RRC messages comprising multiple SPS configuration parameters. The multiple SPS configuration parameters may comprise multiple SPS-RNTI parameters for multiple SPS configurations (e.g. multiple UL SPS configurations).

In an example, a UE configured with multiple SPS C-RNTIs may need to monitor search space of PDCCH for multiple SPS C-RNTIs, this mechanism may increase UE processing requirements and/or power consumption. There is a need to improve eNB and UE implementation and enhance network performance when multiple SPSs are configured for a given UE. Some of the example embodiments may implement multiple SPS C-RNTI, and some may implement a single SPS C-RNTI.

In an example embodiment, when multiple SPS grant types are configured for a UE, for example, when multiple SPS-ConfigUL are configured on a cell or when multiple SPS grant types are configured within an SPS-ConfigUL, RRC configuration parameters may comprise an index (may be called SPS index, SPS identifier, SPS parameter, or any other name). Multiple uplink SPSs parameters may be assigned to (associated with) the same SPS C-RNTI. A different SPS configuration (e.g. having different periods) may be assigned to the same SPS C-RNTI, and may be identified by different SPS indexes. The example mechanism may also be applied to DL and/or Sidelink SPS configurations. In example embodiment, multiple SPS configurations (e.g. multiple periodicity, MCS, and/or other parameters) may be triggered employing the same SPS C-RNTI.

In an example, SPS-ConfigUL1 may be assigned SPS C-RNTI and SPS-index1, and SPS-ConfigUL2 may be assigned SPS C-RNTI and SPS-Index2. An eNB may transmit one or more RRC messages comprising configuration parameters of one or more cells (e.g. PCell and/or SCell(s)). The configuration parameters may include configuration parameters for a plurality of SPSs. The configuration parameters may comprise the SPS C-RNTI, SPS-index1 and SPS-index2.

In an example, SPS-ConfigUL may be assigned SPS C-RNTI and may comprise SPS-index1 and SPS-Index2. One or more first SPS configuration parameters may be associated with SPS-index1 and one or more second SPS configuration parameters may be associated with SPS-Index2. Example of SPS configuration parameters maybe periodicity, MCS, grant size, and/or any other SPS configuration parameter presented in RRC SPS configuration. An eNB may transmit one or more RRC messages comprising configuration parameters of one or more cells (e.g. PCell and/or SCell(s)). The configuration parameters may include configuration parameters for SPSs. The configuration parameters may comprise the SPS C-RNTI, SPS-index1 and SPS-index2.

In an example, the UE configured with SPS configurations may monitor PDCCH and search for a DCI associated with the SPS C-RNTI (e.g. scrambled with SPS-CRNTI). The eNB may transmit a DCI associated to SPS C-RNTI to the UE to activate or release a SPS grant. The UE may decode a DCI associated with the SPS C-RNTI. The DCI may comprise one or more fields comprising information about the grant. The DCI may further comprise an SPS index. The SPS index may determine which one of the SPS configurations are activated or released.

Example fields in the DCI grants for an SPS in a legacy system is presented in the specifications. Many of fields are marked by N/A. In an example embodiment, one of the existing fields (e.g. one of the N/A fields), or a new field may be introduced in a DCI for configuration of the SPS index. A field in the DCI may identify which one of the SPS configurations is activated or released. The UE may transmit or receive data according the grant and SPS configuration parameters.

In an example embodiment, a wireless device may receive at least one message comprising: a semi-persistent scheduling (SPS) cell radio network temporary identifier (C-RNTI); a first SPS configuration parameter(s); a second SPS configuration parameter(s); a first index value associated with the first SPS configuration parameters; and a second index value associated with the second SPS configuration parameters. The wireless device may receive a downlink control information (DCI) associated with the SPS C-RNTI. The DCI comprises one or more fields of an SPS grant and an index value. The wireless device may transmit/receive SPS traffic on radio resources identified in the SPS grant considering the SPS configuration parameters associated with the index value. The SPS configuration parameter associated with the index may include, for example, SPS periodicity, MCS, radio resource parameters, and/or other SPS parameters included in SPS configurations.

In an example, the index may be implicitly configured. SPS configurations may include a sequence of various options for a parameter. An index of a parameter may be the order of the parameter in the sequence. In an example embodiment, a wireless device may receive at least one message comprising: a semi-persistent scheduling (SPS) cell radio network temporary identifier (C-RNTI); SPS configuration parameters; a sequence of a plurality of SPS parameter, e.g. periodicities. An SPS periodicity value may be identified by a periodicity index. The wireless device may receive a downlink control information (DCI) associated with the SPS C-RNTI. The DCI may comprise one or more fields of an SPS grant and a first periodicity index value. The wireless device may transmit/receive SPS traffic on radio resources identified in the SPS grant considering the SPS configuration parameters, and a first periodicity associated with the first periodicity index value. This embodiment may be employed when one or more SPS C-RNTI is configured. A given SPS traffic (message type) may be transmitted with various periodicity depending on vehicle speed or other parameters. This mechanism enables updating SPS grant periodicity with the need for reconfiguring SPS grants. A set of one or more RRC configuration parameters may be applicable to different SPS periodicities. The example embodiment may be extended to other parameters such as RBs, MCS, and others.

In an example, the SPS DCI may include the SPS grant periodicity, instead of the index value for the periodicity. Since a large number of periodicities may be supported. This embodiment may increase the size of DCI, but may reduce the size of the SPS RRC configuration.

In an example embodiment, an SPS grant may be for a specific message type. In current mechanisms, a DCI grant does not comprise information on traffic types associated with the grant. In an example embodiment, a wireless device may receive at least one message comprising: a semi-persistent scheduling (SPS) cell radio network temporary identifier (C-RNTI); a first SPS configuration parameters; a second SPS configuration parameters; a traffic index value associated with the first SPS configuration parameters; and/or a traffic index value associated with the second SPS configuration parameters. The index for the traffic type may be a logical channel identifier, bearer identifier, V2X traffic type identifier, and/or the like. The identifier may also determine a relative priority of the traffic type compared with other traffics. The wireless device may receive a downlink control information (DCI) associated with the SPS C-RNTI. The DCI may comprise one or more fields of an SPS grant and a traffic index value (LCI, bearer identifier, V2X traffic type identifier, and/or the like). The wireless device may transmit SPS traffic on radio resources identified in the SPS grant considering the SPS traffic associated with the traffic index value. The DCI grant may include one or more parameters identifying the traffic associated with the grant. Example embodiment may be employed with one or more SPS C-RNTI are configured.

In an example, eNB may configure a V2X UL SPS RNTI for the UE. The V2X UL SPS RNTI may be different from the legacy SPS C-RNTI. In an example, a DCI format 0 scrambled with V2X UL SPS RNTI may be used to activate and/or update the V2X SPS for the UE.

In an example, multiple SPS configurations can be active at the same time. In an example, one or more indicators in the DCI activating the SPS (e.g., DCI format 0) may be used to differentiate SPS configurations. In an example, the one or more indicator may be SPS index and/or one or more indicator mapped to the SPS index.

In an example, a SPS configuration index may be signaled to the UE when the eNB activates and/or reactivates and/or updates the SPS for the UE. In an example, the eNB may use the Cyclic shift DM RS field (3 bits) in DCI 0 to indicate to the UL SPS configuration index to the UE. In an example, another field in DCI format 0 (e.g., the TPC command field (2 bits)) in DCI 0 may be considered to indicate UL SPS configuration index.

In an example, the eNB may activate a single SPS configuration with a DCI and the UL SPS DCI may contain a single SPS configuration index. In an example, the eNB may transmit multiple DCIs for activation of multiple SPS configurations. In an example, the eNB may transmit as many DCIs as the SPS configurations that the eNB activates for a UE.

In an example, activation of one SPS configuration may release the previous allocation for the same SPS configuration.

In an example, the eNB may explicitly release a SPS configuration for a UE. In an example, the eNB may explicitly release the SPS by sending a DCI (e.g., DCI 0) and the UE may validate the DCI as an indication for release by comparing one or more fields of the DCI with pre-configured values. In an example, the UE may release the SPS without explicit indication of the eNB. Both explicit release and implicit release mechanisms for SPS over Uu may be supported.

In an example, the UE may explicitly signal to the eNB (e.g., using MAC CE and/or with one or more RRC messages) to indicate to the eNB when the UE desires to activate and/or update and/or release a SPS configuration. In an example, when the UE indicates to the eNB that it desires to activate a SPS configuration, the UE may include a desirable time offset in its indication to the eNB. In an example, the desirable time offset may be relative to system frame number 0 (SFN0).

In an example, when the UE desires to change the period of a SPS configuration, the UE may signal this to the eNB. In an example, the signaling may be in form of MAC CE. In an example, the signaling may be in form of RRC signaling.

In an example, in the event of a resource conflict between SPS configurations (e.g., two or more SPS grants from two or more SPS configurations in a subframe), only one transmission may occur. In an example, a mechanism and/or rule may be used for resolving resource conflicts between SPS configurations.

In an example, the eNB may configure an SL SPS RNTI different from SL dynamic scheduling RNTI for a UE. In an example, two fields may be included in the DCI scheduling the SL SPS. In an example, a SL SPS configuration index may be included in the DCI scheduling SL SPS. In an example, the SL SPS configuration index may be 3 bits. In an example an Activation/release indication may be included in the DCI scheduling the SL SPS. In an example, the Activation/release indication field may be 1 bit.

In an example, a SL SPS DCI may contain a single SPS configuration index.

In an example, if the number of information bits in SL SPS DCI format mapped onto a given search space is less than the payload size of DCI format 0 mapped onto the same search space, zeros may be appended to SL SPS DCI format until the payload size equals that of DCI format 0 including any padding bits appended to DCI format 0.

In an example, the size of SL SPS DCI format may be larger than the size of DCI format 0 on the same search space. In an example, a UE may use an acknowledgement feedback mechanism after the reception of a DCI indicating SL SPS activation and/or release. In an example, a counter may be used by the MAC and the SPS may be released if there is no MAC PDU for a configured number of consecutive SPS occasions without data. In an example, when a SPS configuration is activated for an SPS process, previously configured SPS process may be released.

In an example, a UE may identify a SPS process associated to a DCI based on the contents of the DCI. In an example, there may be one-to-one mapping between SPS configuration index and SPS process. In an example, there may be semi-static (e.g., configured by higher layer) association between SPS configuration index and SPS process. Multiple SPS configurations can be associated to a SPS process. In an example, there may be dynamic indication (e.g., explicitly and/or implicitly) of SPS process associated to a SPS DCI.

Figure 10:
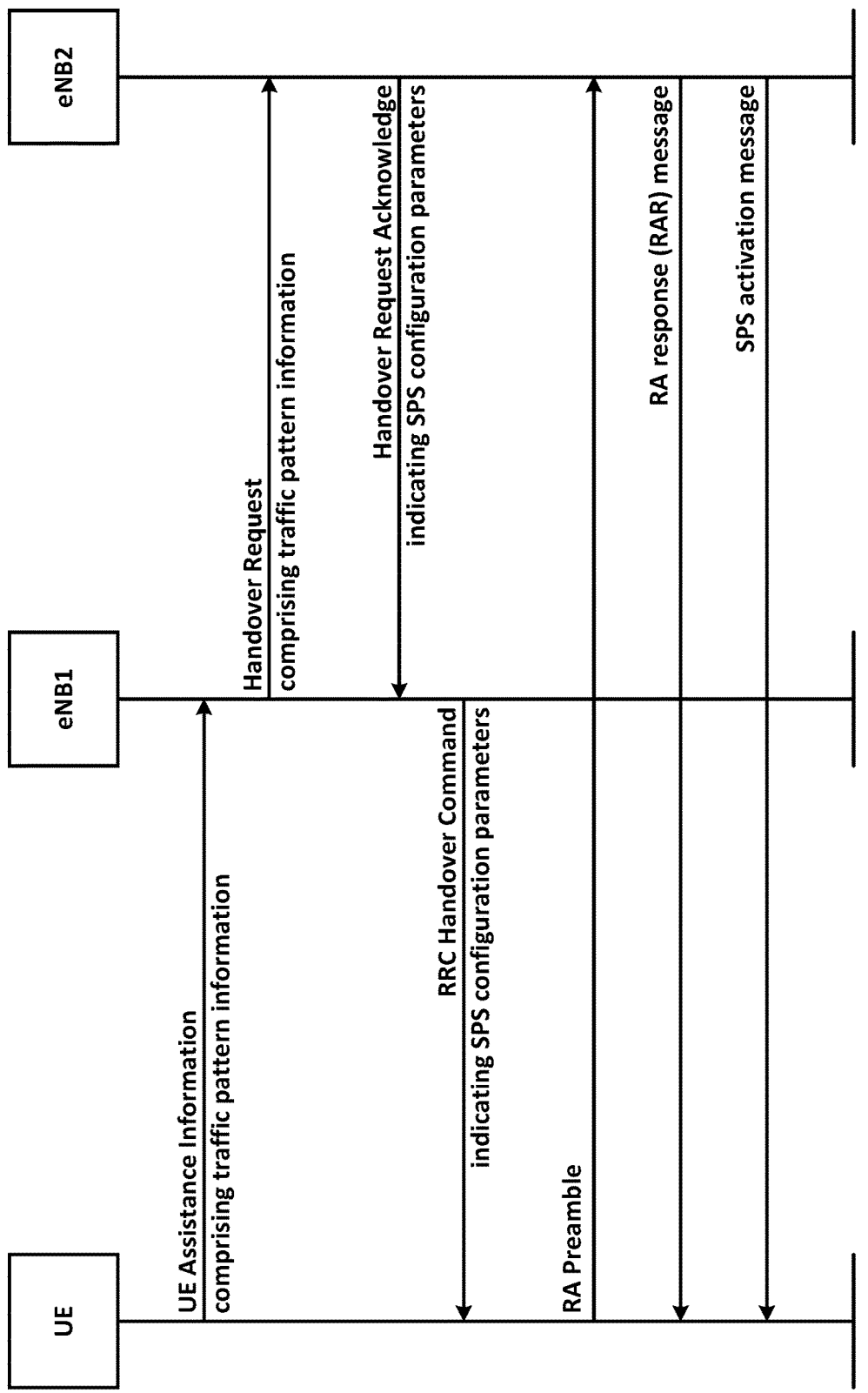
FIG. 10 is an example data flow diagram as per an aspect of embodiments of the present disclosure.
Figure 11:
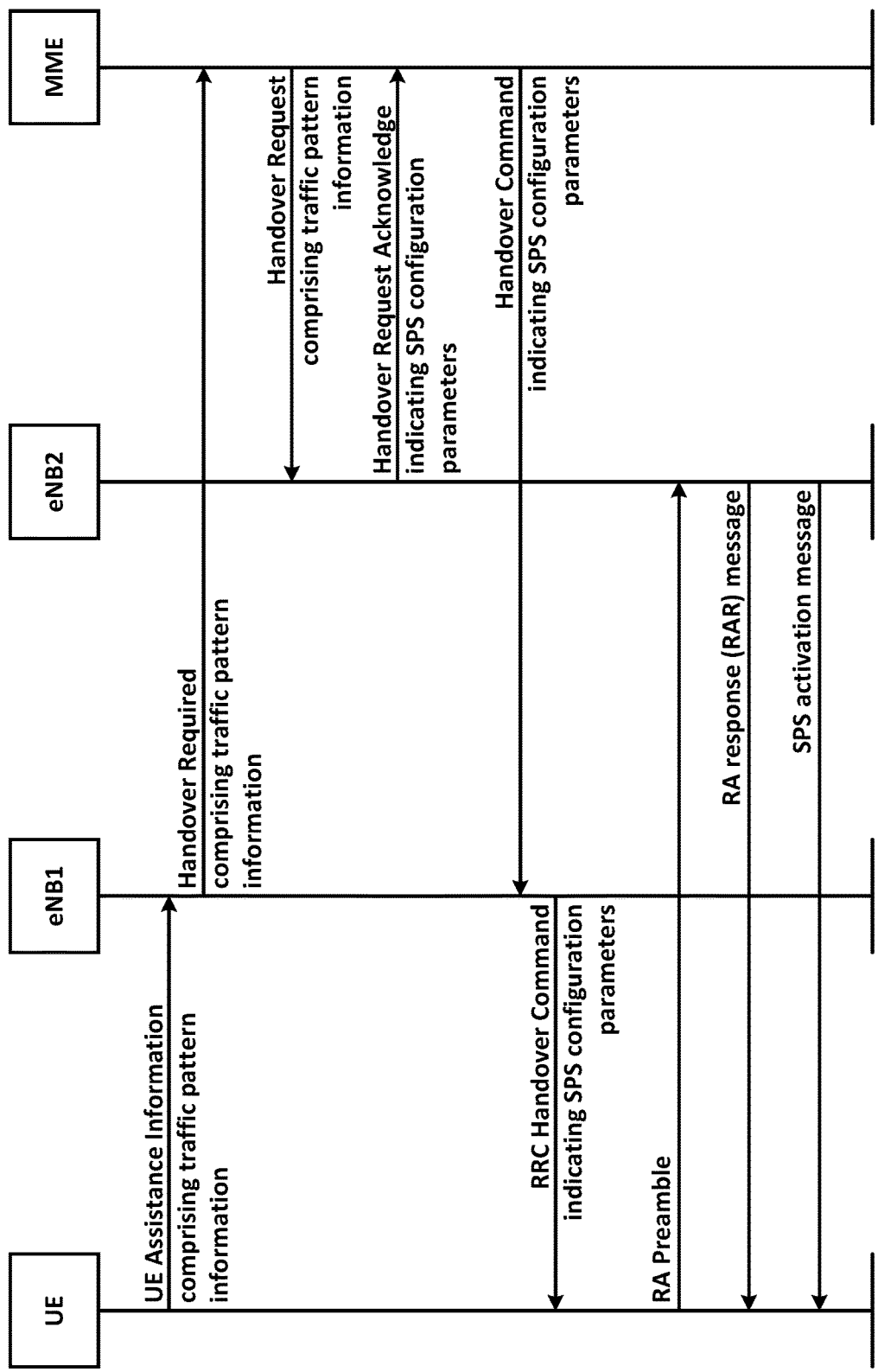
FIG. 11 is an example data flow diagram as per an aspect of embodiments of the present disclosure.
Figure 12:
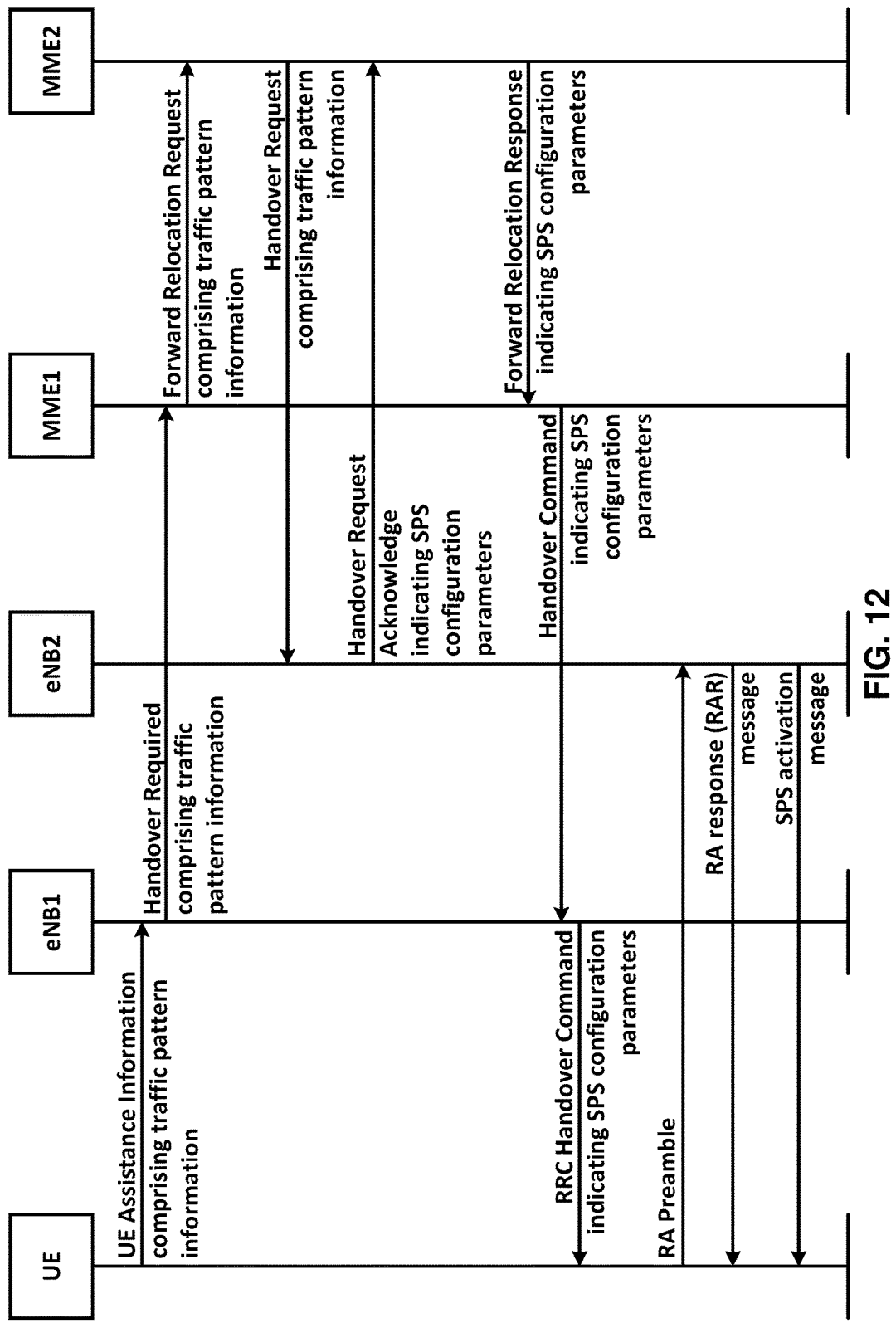
FIG. 12 is an example data flow diagram as per an aspect of embodiments of the present disclosure.

As shown in FIGS. 10-12, a UE configured with SPS may transmit assistance information to the eNB to activate and/or release and/or update a SPS configuration. In an example, the UE assistance may be signaled to the eNB with MAC CE and/or one or more RRC messages.

In an example, the UE assistance information reporting may be triggered based on UE implementation. In an example, some rules may be used to limit the amount of UE assistance reporting from UE. In an example, the UE assistance report may not be sent if the offset to the next SPS occasion is not greater than a threshold. In an example, the threshold may be configured. In an example, a prohibit timer may be used. In an example, the eNB may control the UE assistance reporting. In an example, the trigger to transmit the UE assistance may be cancelled based on some rule. In an example, the trigger to transmit the UE assistance may be cancelled if the eNB activates and/or reactivates a SPS configuration that matches the UE requirement (e.g., with a periodicity and timing offset that matches the UE data).

In an example, the UE assistance information may include the periodicity and timing offset. In an example, the UE may send the preferred SPS interval in the assistance information if the periodicity of packet generation changes. In an example, the preferred SPS interval in the UE assistance information may be expected packet periodicity. In an example, the preferred SPS interval in the UE assistance information may be the interval between the last two generated packets. In an example, the preferred SPS interval in the UE assistance information may be average inter-packet generation time for a last period of time. In an example, the last period of time may be configured for the UE. In an example, the last period of time may be RRC configured for the UE. In an example, the UE may estimate the periodicity and timing offset based on UE implementation.

In an example, the UE assistance triggers may be left to UE implementation. In an example, the network may configure the UE assistance information for the UE. In an example, explicit SPS resource release by eNB may be based on UE's transmission or indications. In an example, the UE assistant information may include a set of preferred expected SPS interval, timing offset with respect subframe0 of the SFN0. In an example, SPS periodicity values may be 50 ms, 100 ms, 200 ms, 300 ms, 400 ms, 500 ms, 600 ms, 700 ms, 800 ms, 900 ms and 1000 ms UL and/or SPS.

In an example, the UE assistance information may be per logical channel. In an example, the UE assistance information may be reported if change is estimated in periodicity of packet arrival. In an example, the UE assistance information may be reported if change is estimated in offset of packet arrival. In an example, the UE assistance information may be configured by the eNB. In an example, the UE assistance information may be reported in case SPS configured for the UE and/or in case SPS is not configured for the UE. In an example, the UE assistance information may include the existing or a suggested SPS configuration. In an example, the UE assistance information may include the index of SPS configuration.

In an example, up to 8 SPS configurations may be configured per UE. In an example, 3 bits may be used in the scheduling DCI that may correspond to the 8 SPS configurations. In an example, the configured SPSs may be simultaneously active. In an example, there may be an association between a SPS configuration and logical channel ID (LCID) and/or ProSe Per-Packet Priority (PPPP). In an example, the association in UL SPS may be based on LCID. In an example, the association in SL SPS may be based on PPPP. In an example, one traffic type (e.g., one LCID and/or one PPPP may be associated to multiple SPS configurations.

In an example, the eNB may configure the UE with a sidelink SPS release mechanism. In an example, after a configurable number of consecutive sidelink SPS occasions are not used by the UE, the UE may notify the network and may consider the specific sidelink SPS released. In an example, the eNB may configure a valid duration for an SPS activated. In an example, the valid duration may be configured by RRC. In an example, when the time elapsed exceeds the valid duration since the activation for a specific SPS, the UE and eNB may implicitly release the SPS. In an example, if a sidelink SPS release mechanism is not configured by the eNB, it may be up to UE implementation to determine when a sidelink traffic is terminated and report this information to the eNB. In an example, the UE may report the information using MAC CE. In an example, the UE may report this information using PUCCH and/or a UCI.

In an example, the SPS configurations may be provided by the eNB to UEs in RRC signaling. In an example, the SPS configuration may comprise Sidelink SPS scheduling interval (e.g., the specific SPS periodicity for the SPS configuration), the index of the SPS configuration (e.g., the index that may be used by PDCCH in DCI to (re)activate/release a configured SPS configuration. The SPS index may also be used in the UE assistance information), the LCID associated to the SPS configuration, the PPPP associated to the SPS configuration, the number of sidelink empty transmissions before release, the carrier in which this SPS configuration applies (e.g., in case of multi-carrier sidelink transmissions, it may indicate the carrier in which a specific SPS configuration applies), the destination L2 ID associated to the SPS configuration, the valid duration associated to the SPS configuration, etc.

In an example, the UE assistance information may be reported both in case SPS is configured or not. In an example, the report of the UE assistance information may be configured by the eNB only for certain logical channels/PPPP. In an example, the UE may report the periodicity/offset changes of the traffics associated to those logical channels/PPPP configured by the eNB. In an example, the UE assistance information, if configured, may be reported by the UE for any logical channel/PPPP. In an example, the UE assistance information may be reported by the UE for any logical channel identified by a pair of LCID and Destination L2 ID. In an example, the UE assistance information may be delivered in a MAC CE and/or in RRC. In an example, the UE assistance information may use the existing RRC message UEAssistanceInformation with some new fields introduced.

In an example, the estimated periodicity of packet arrivals, the estimated offset with respect to subframe0 of the SFN0, and the SPS index of the SPS configuration (e.g., if SPS is configured by the eNB) may be included in the UE assistance information. In an example, the UE may indicate in the UE assistance message, the LCID to which the content of the UE Assistance Information is associated. In an example, the UE may indicate in the UE assistance message, the PPPP to which the content of the UE Assistance Information is associated. In an example, the UE may indicate, in the UE assistance message, the estimated packet size of next transmission. In an example, the UE may indicate, in the UE assistance message, the Destination L2 ID for the associated logical channel.

In an example, the AS-Context information element may be used to transfer local E-UTRAN context required by the target eNB. In an example, idc-Indication may include information used for handling the IDC problems. In an example, reestablishmentInfo may include information needed for the RRC connection re-establishment. In an example, the HO field may be mandatory present in case of handover within E-UTRA. In an example, HO2 field may be optionally present in case of handover within E-UTRA.

In an example, the UEAssistanceInformation message may be used for the indication of UE assistance information to the eNB. In an example, the signalling radio bearer may be SRB1. In an example, the RLC-SAP mode may be AM. In an example, the corresponding logical channel may be DCCH. In an example, direction of this message may be from UE to the E-UTRAN.

In an example, the value lowPowerConsumption of powerPrefIndication may indicate the UE prefers a configuration that is primarily optimised for power saving. In an example, the value of powerPrefIndication may be set to normal.

As shown in FIG. 10, for X2 based handover, the handover source eNB may initiate the procedure by sending the HANDOVER REQUEST message to the target eNB. When the source eNB sends the HANDOVER REQUEST message, it may start the timer TRELOCprep.

The allocation of resources according to the values of the Allocation and Retention Priority IE included in the E-RAB Level QoS Parameters IE may follow the principles of an E-RAB Setup procedure. The source eNB may include in the GUMMEI IE and/or GUMMEI corresponding to the source MME node. If at least one of the requested non-GBR E-RABs is admitted to the cell indicated by the Target Cell ID IE, the target eNB may reserve necessary resources, and/or send the HANDOVER REQUEST ACKNOWLEDGE message back to the source eNB. The target eNB may include the E-RABs for which resources have been prepared at the target cell in the E-RABs Admitted List IE. The target eNB may include the E-RABs that have not been admitted in the E-RABs Not Admitted List IE with an appropriate cause value.

At reception of the HANDOVER REQUEST message the target eNB may prepare the configuration of the AS security relation between the UE and the target eNB by using the information in the UE Security Capabilities IE and the AS Security Information IE in the UE Context Information IE.

In an example, for E-RAB for which the source eNB proposes to do forwarding of downlink data, the source eNB may include the DL Forwarding IE within the E-RABs To be Setup Item IE of the HANDOVER REQUEST message. For E-RAB that it has decided to admit, the target eNB may include the DL GTP Tunnel Endpoint IE within the E-RABs Admitted Item IE of the HANDOVER REQUEST ACKNOWLEDGE message to indicate that it accepts the proposed forwarding of downlink data for this bearer. This GTP tunnel endpoint may be different from the corresponding GTP TEID IE in the E-RAB To Be Switched in Downlink List IE of the PATH SWITCH REQUEST message depending on implementation choice.

For bearer in the E-RABs Admitted List IE, the target eNB may include the UL GTP Tunnel Endpoint IE to indicate that it requests data forwarding of uplink packets to be performed for that bearer.

In an example, upon reception of the HANDOVER REQUEST ACKNOWLEDGE message the source eNB may stop the timer TRELOCprep, start the timer TX2RELOCoverall and terminate the Handover Preparation procedure. The source eNB may be defined to have a Prepared Handover for that X2 UE-associated signalling.

In an example, if the Trace Activation IE is included in the HANDOVER REQUEST message, the target eNB may, if supported, initiate the requested trace function as described in TS 32.422 [6]. In particular, the target eNB may, if supported: if the Trace Activation IE does not include the MDT Configuration IE, initiate the requested trace session; if the Trace Activation IE includes the MDT Activation IE, within the MDT Configuration IE, set to "Immediate MDT and Trace" initiate the requested trace session and MDT session; if the Trace Activation IE includes the MDT Activation IE, within the MDT Configuration IE, set to "Immediate MDT Only" initiate the requested MDT session and the target eNB may ignore Interfaces To Trace IE, and Trace Depth IE; if the Trace Activation IE includes the MDT Location Information IE, within the MDT Configuration IE, store this information and take it into account in the requested MDT session; or if the Trace Activation IE includes the Signalling based MDT PLMN List IE, within the MDT Configuration IE, the eNB may use it to propagate the MDT Configuration.

In an example, if the Management Based MDT Allowed IE only or the Management Based MDT Allowed IE and the Management Based MDT PLMN List IE is contained in the HANDOVER REQUEST message, the target eNB may, if supported, store the received information in the UE context, and use this information to allow subsequent selection of the UE for management based MDT. In an example, if the Masked IMEISV IE is contained in the HANDOVER REQUEST message the target eNB may, if supported, use it to determine the characteristics of the UE for subsequent handling.

In an example, the source eNB may, if supported and available in the UE context, include the Management Based MDT Allowed IE and the Management Based MDT PLMN List IE in the HANDOVER REQUEST message, except if the source eNB selects a serving PLMN in the target eNB which is not included in the Management Based MDT PLMN List. If the Management Based MDT PLMN List IE is not present, the source eNB may, if supported, include the Management Based MDT Allowed IE, if this information is available in the UE context, in the HANDOVER REQUEST message, except if the source eNB selects a serving PLMN in the target eNB different from the serving PLMN in the source eNB.

In an example, if the Handover Restriction List IE is contained in the HANDOVER REQUEST message, the target eNB may store the information received in the Handover Restriction List IE in the UE context, use this information to determine a target for the UE during subsequent mobility action for which the eNB provides information about the target of the mobility action towards the UE, except when one of the E-RABs has a particular ARP value in which case the information may not apply, and/or use this information to select a proper SCG during dual connectivity operation. If the Handover Restriction List IE is not contained in the HANDOVER REQUEST message, the target eNB may consider that no roaming and no access restriction apply to the UE.

In an example, if the Location Reporting Information IE is included in the HANDOVER REQUEST message, the target eNB may initiate the requested location reporting functionality. If the SRVCC Operation Possible IE is included in the HANDOVER REQUEST message, the target eNB may store the content of such IE in the UE context and use it. If the UE Security Capabilities IE included in the HANDOVER REQUEST message only contains the EIA0 algorithm and if this EIA0 algorithm is defined in the configured list of allowed integrity protection algorithms in the eNB, the eNB may take it into use and ignore the keys received in the AS Security Information IE.

In an example, the HANDOVER REQUEST message may contain the Subscriber Profile ID for RAT/Frequency priority IE, if available. If the Subscriber Profile ID for RAT/Frequency priority IE is contained in the HANDOVER REQUEST message, the target eNB may store this information and the target eNB may use the information. Upon reception of UE History Information IE in the HANDOVER REQUEST message, the target eNB may collect the information defined as mandatory in the UE History Information IE and may, if supported, collect the information defined as optional in the UE History Information IE, for as long as the UE stays in one of its cells, and store the collected information to be used for future handover preparations. Upon reception of the UE History Information from the UE IE in the HANDOVER REQUEST message, the target eNB may, if supported, store the collected information to be used for future handover preparations. If the Mobility Information IE is provided in the HANDOVER REQUEST message, the target eNB may, if supported, store this information and use it. The target eNB may, if supported, store the C-RNTI of the source cell received in the HANDOVER REQUEST message.

In an example, if the Expected UE Behavior IE is provided in the HANDOVER REQUEST message, the target eNB may, if supported, store this information and may use it to determine the RRC connection time. If the ProSe Authorized IE is contained in the HANDOVER REQUEST message and it contains one or more IEs set to "authorized", the eNB may, if supported, consider that the UE is authorized for the relevant ProSe service(s). If the V2X Services Authorized IE is contained in the HANDOVER REQUEST message and it contains one IE set to "authorized", the eNB may, if supported, consider that the UE is authorized for the relevant service(s). If the UE Context Reference at the SeNB IE is contained in the HANDOVER REQUEST message the target eNB may use it. In this case, the source eNB may expect the target eNB to include the UE Context Kept Indicator IE set to "True" in the HANDOVER REQUEST ACKNOWLEDGE message, which may use this information. If the Bearer Type IE is included in the HANDOVER REQUEST message and is set to "non IP", the target eNB may not perform header compression for the concerned E-RAB.

As shown in FIGS. 11-12, for S1 based handover, the source eNB may initiate the handover preparation by sending the HANDOVER REQUIRED message to the serving MME. When the source eNB sends the HANDOVER REQUIRED message, it may start the timer TS1RELOCprep. The source eNB may indicate the appropriate cause value for the handover in the Cause IE. The source eNB may include the Source to Target Transparent Container IE in the HANDOVER REQUIRED message.

In an example, in case of intra-system handover, the information in the Source to Target Transparent Container IE may be encoded according to the definition of the Source eNB to Target eNB Transparent Container IE. In case of handover to UTRAN, the information in the Source to Target Transparent Container IE may be encoded according to the Source RNC to Target RNC Transparent Container IE definition and/or the source eNB may include the UE History Information IE in the Source RNC to Target RNC Transparent Container IE. If the handover is to GERAN A/Gb mode, the information in the Source to Target Transparent Container IE may be encoded according to the definition of the Source BSS to Target BSS Transparent Container IE. When the preparation, including the reservation of resources at the target side is ready, the MME may respond with the HANDOVER COMMAND message to the source eNB.

In an example, if the Target to Source Transparent Container IE has been received by the MME from the handover target, the transparent container may be included in the HANDOVER COMMAND message. Upon reception of the HANDOVER COMMAND message the source eNB may stop the timer TS1RELOCprep and start the timer TS1RELOCOverall.

In an example, in case of intra-system handover, the information in the Target to Source Transparent Container IE may be encoded according to the definition of the Target eNB to Source eNB Transparent Container IE. In case of inter-system handover to UTRAN, the information in the Target to Source Transparent Container IE may be encoded according to the Target RNC to Source RNC Transparent Container IE. In case of inter-system handover to GERAN A/Gb mode, the information in the Target to Source Transparent Container IE may be encoded according to the Target BSS to Source BSS Transparent Container IE definition. In an example, if there are any E-RABs that could not be admitted in the target, they may be indicated in the E-RABs to Release List IE.

In an example, if the DL forwarding IE is included within the Source eNB to Target eNB Transparent Container IE of the HANDOVER REQUIRED message and/or it is set to "DL forwarding proposed", it may indicate that the source eNB proposes forwarding of downlink data. In an example, if the MME receives the Direct Forwarding Path Availability IE in the HANDOVER REQUIRED message indicating that a direct data path is available, it may handle it.

In an example, if the CSG Id IE and no Cell Access Mode IE are received in the HANDOVER REQUIRED message, the MME may perform the access control according to the CSG Subscription Data of that UE and, if the access control is successful or if at least one of the E-RABs has a particular ARP value, it may continue the handover and propagate the CSG Id IE to the target side. If the access control is unsuccessful but at least one of the E-RABs has a particular ARP value, the MME may provide the CSG Membership Status IE set to "non-member" to the target side. In an example, if the CSG Id IE and the Cell Access Mode IE set to "hybrid" are received in the HANDOVER REQUIRED message, the MME may provide the membership status of the UE and the CSG Id to the target side.

In an example, the source eNB may include the SRVCC HO Indication IE in the HANDOVER REQUIRED message if the SRVCC operation is needed. The source eNB may indicate to the MME in the SRVCC HO Indication IE if the handover may be prepared for PS and CS domain or only for CS domain. The SRVCC HO Indication IE is set according to the target cell capability and UE capability. In case the target system is GERAN without DTM support or the UE is without DTM support, the source eNB may indicate "CS only" in the SRVCC HO Indication IE and "PS service not available" in PS Service Not Available IE. In case the target system is either GERAN with DTM but without DTM HO support and the UE is supporting DTM or the target system is UTRAN without PS HO support, the source eNB may indicate "CS only" in the SRVCC HO Indication IE. Otherwise, the source eNB may indicate "PS and CS" in the SRVCC HO Indication IE.

In an example, in case of inter-system handover from E-UTRAN, the source eNB may indicate in the Target ID IE, in case the target system is UTRAN, the Target RNC-ID of the RNC (including the Routing Area Code only in case the UTRAN PS domain is involved), in case the target system is GERAN the Cell Global Identity (including the Routing Area Code only in case the GERAN PS domain is involved) of the cell in the target system.

In an example, in case of inter-system handover from E-UTRAN to UTRAN, the source eNB may, if supported, include the HO Cause Value IE in the UE History Information IE of the HANDOVER REQUIRED message. In an example, in case the SRVCC operation is performed and the SRVCC HO Indication IE indicates that handover may be prepared only for CS domain, and if the target system is GERAN, the source eNB: may encode the information in the Source to Target Transparent Container IE within the HANDOVER REQUIRED message, according to the definition of the Old BSS to New BSS information IE; and/or may not include the Source to Target Transparent Container Secondary IE in the HANDOVER REQUIRED message. If the target system is UTRAN, the source eNB: may encode the information in the Source to Target Transparent Container IE within the HANDOVER REQUIRED message according to the definition of the Source RNC to Target RNC Transparent Container IE; may include the UE History Information IE in the Source RNC to Target RNC Transparent Container IE; and/or may not include the Source to Target Transparent Container Secondary IE in the HANDOVER REQUIRED message.

In an example, in case the SRVCC operation is performed, the SRVCC HO Indication IE in the HANDOVER REQUIRED message may indicate that handover may be prepared for PS and CS domain, and if the target system is GERAN with DTM HO support, the source eNB: may encode the information in the Source to Target Transparent Container IE within the HANDOVER REQUIRED message according to the definition of the Source BSS to Target BSS Transparent Container IE; and/or may include the Source to Target Transparent Container Secondary IE in the HANDOVER REQUIRED message and encode information in it according to the definition of the Old BSS to New BSS information IE. If the target system is UTRAN, the source eNB: may encode the information in the Source to Target Transparent Container IE within the HANDOVER REQUIRED message according to the definition of the Source RNC to Target RNC Transparent Container IE; may include the UE History Information IE in the Source RNC to Target RNC Transparent Container IE; and/or may not include the Source to Target Transparent Container Secondary IE in the HANDOVER REQUIRED message.

In an example, if the HANDOVER COMMAND message contains the DL GTP-TEID IE and the DL Transport Layer Address IE for a given bearer in the E-RABs Subject to Forwarding List IE, the source eNB may consider that the forwarding of downlink data for this given bearer is possible. If the HANDOVER COMMAND message contains the UL GTP-TEID IE and the UL Transport Layer Address IE for a given bearer in the E-RABs Subject to Forwarding List IE, it may mean the target eNB has requested the forwarding of uplink data for this given bearer.

In an example, if, after a HANDOVER REQUIRED message is sent and before the Handover Preparation procedure is terminated, the source eNB receives an MME initiated E-RAB Management procedure on the same UE associated signalling connection, the source eNB may either: cancel the Handover Preparation procedure by executing the Handover Cancel procedure with an appropriate cause value. After successful completion of the Handover Cancel procedure, the source eNB may continue the MME initiated E-RAB Management procedure; or terminate the MME initiated E-RAB Management procedure by sending the appropriate response message with an appropriate cause value, e.g., "S1 intra system Handover Triggered", "S1 inter system Handover Triggered" to the MME and the source eNB may continue with the handover procedure.

In an example, for S1 based handover, the MME may initiate the procedure by sending the HANDOVER REQUEST message to the target eNB. The HANDOVER REQUEST message may contain the Handover Restriction List IE, which may contain roaming or access restrictions. In an example, if the Handover Restriction List IE is contained in the HANDOVER REQUEST message, the target eNB may store this information in the UE context. This information may not be considered whenever one of the handed over E-RABs has a particular ARP value.

In an example, the target eNB may use the information in Handover Restriction List IE if present in the HANDOVER REQUEST message to determine a target for subsequent mobility action for which the eNB provides information about the target of the mobility action towards the UE, and/or to select a proper SCG during dual connectivity operation. In an example, if the Handover Restriction List IE is not contained in the HANDOVER REQUEST message, the target eNB may consider that no roaming and no access restriction apply to the UE. In an example, upon reception of the HANDOVER REQUEST message, the eNB may store the received UE Security Capabilities IE in the UE context and use it to prepare the configuration of the AS security relation with the UE.

In an example, if the SRVCC Operation Possible IE is included in the HANDOVER REQUEST message, the target eNB may store the content of the received SRVCC Operation Possible IE in the UE context and, if supported, use it. In an example, upon reception of the HANDOVER REQUEST message, the eNB may store the received Security Context IE in the UE context and the eNB may use it to derive the security configuration. In an example, if the Trace Activation IE is included in the HANDOVER REQUEST message, the target eNB may, if supported, initiate the requested trace function. In example embodiments, the eNB may: if the Trace Activation IE does not include the MDT Configuration IE, initiate the requested trace session; if the Trace Activation IE includes the MDT Activation IE, within the MDT Configuration IE, set to "Immediate MDT and Trace", initiate the requested trace session and MDT session; if the Trace Activation IE includes the MDT Activation IE, within the MDT Configuration IE, set to "Immediate MDT Only", "Logged MDT only" or "Logged MBSFN MDT", initiate the requested MDT session and/or the target eNB may ignore Interfaces To Trace IE, and/or Trace Depth IE; if the Trace Activation IE includes the MDT Location Information IE, within the MDT Configuration IE, store this information and take it into account in the requested MDT session; if the Trace Activation IE includes the Signalling based MDT PLMN List IE, within the MDT Configuration IE, the eNB may use it to propagate the MDT Configuration; if the Trace Activation IE includes the MBSFN-Result-ToLog IE, within the MDT Configuration IE, take it into account for MDT Configuration; if the Trace Activation IE includes the MBSFN-AreaId IE in the MBSFN-Result-ToLog IE, within the MDT Configuration IE, take it into account for MDT Configuration; or If the CSG Id IE is received in the HANDOVER REQUEST message, the eNB may compare the received value with the CSG Id broadcast by the target cell.

In an example, if the CSG Membership Status IE is received in the HANDOVER REQUEST message and the CSG Membership Status is set to "member", the eNB may provide the QoS to the UE as for member provided that the CSG Id received in the HANDOVER REQUEST messages corresponds to the CSG Id broadcast by the target cell. In an example, if the CSG Membership Status IE and the CSG Id IE are received in the HANDOVER REQUEST message and the CSG Id does not correspond to the CSG Id broadcast by the target cell, the eNB may provide the QoS to the UE as for a non-member and may send back in the HANDOVER REQUEST ACKNOWLEDGE message the actual CSG Id broadcast by the target cell. In an example, if the target cell is CSG cell or hybrid cell, the target eNB may include the CSG ID IE in the HANDOVER REQUEST ACKNOWLEDGE message.

In an example, if the target eNB receives the CSG Id IE and the CSG Membership Status IE is set to "non member" in the HANDOVER REQUEST message and the target cell is a closed cell and at least one of the E-RABs has a particular ARP value, the eNB may send back the HANDOVER REQUEST ACKNOWLEDGE message to the MME accepting those E-RABs and failing the other E-RABs. In an example, if the Subscriber Profile ID for RAT/Frequency priority IE is contained in the Source eNB to Target eNB Transparent Container IE, the target eNB may store the content of the received Subscriber Profile ID for RAT/Frequency priority IE in the UE context and use it.

In an example, upon reception of the UE History Information IE, which may be included within the Source eNB to Target eNB Transparent Container IE in the HANDOVER REQUEST message, the target eNB may collect the information defined as mandatory in the UE History Information IE, and/or may, if supported, collect the information defined as optional in the UE History Information IE, for as long as the UE stays in one of its cells, and store the collected information to be used for future handover preparations. In an example, upon reception of the UE History Information from the UE IE, which may be included within the Source eNB to Target eNB Transparent Container IE in the HANDOVER REQUEST message, the target eNB may, if supported, store the collected information, to be used for future handover preparations.

In an example, if the Mobility Information IE is included within the Source eNB to Target eNB Transparent Container IE in the HANDOVER REQUEST message, the target eNB may, if supported, store this information and use it. In an example, if the Expected UE Behaviour IE is included in the HANDOVER REQUEST message, the eNB may, if supported, store this information and may use it to determine the RRC connection time. In an example, if the Bearer Type IE is included in the HANDOVER REQUEST message and is set to "non IP", the eNB may not perform header compression for the concerned E-RAB.

As shown in FIGS. 10-12, after all necessary resources for the admitted E-RABs have been allocated, the target eNB may generate the HANDOVER REQUEST ACKNOWLEDGE message. The target eNB may include in the E-RABs Admitted List IE the E-RABs for which resources have been prepared at the target cell. The E-RABs that have not been admitted in the target cell, if any, may be included in the E-RABs Failed to Setup List IE. In an example, if the HANDOVER REQUEST message contains the Data Forwarding Not Possible IE associated with a given E-RAB within the E-RABs To Be Setup List IE set to "Data forwarding not possible", the target eNB may decide not to include the DL Transport Layer Address IE and the DL GTP-TEID IE and for intra LTE handover the UL Transport Layer Address IE and the UL GTP-TEID IE within the E-RABs Admitted List IE of the HANDOVER REQUEST ACKNOWLEDGE message for that E-RAB.

In an example, for a bearer that target eNB has decided to admit and for which DL forwarding IE is set to "DL forwarding proposed", the target eNB may include the DL GTP-TEID IE and the DL Transport Layer Address IE within the E-RABs Admitted List IE of the HANDOVER REQUEST ACKNOWLEDGE message indicating that it accepts the proposed forwarding of downlink data for this bearer. In an example, if the HANDOVER REQUEST ACKNOWLEDGE message contains the UL GTP-TEID IE and the UL Transport Layer Address IE for a given bearer in the E-RABs Admitted List IE, it may mean the target eNB has requested the forwarding of uplink data for this given bearer. In an example, if the Request Type IE is included in the HANDOVER REQUEST message, the target eNB may perform the requested location reporting functionality for the UE.

In an example, if the UE Security Capabilities IE included in the HANDOVER REQUEST message only contains the MO algorithm and/or if this MO algorithm is defined in the configured list of allowed integrity protection algorithms in the eNB, the eNB may take it into use and ignore the keys received in the Security Context IE. In an example, the GUMMEI IE may only be contained in the HANDOVER REQUEST message. If the GUMMEI IE is present, the target eNB may store this information in the UE context and use it for subsequent X2 handovers. In an example, the MME UE S1AP ID 2 IE may only be contained in the HANDOVER REQUEST message. In an example, if the MME UE S1AP ID 2 IE is present, the target eNB may store this information in the UE context and use it for subsequent X2 handovers.

In an example, if the Management Based MDT Allowed IE only or the Management Based MDT Allowed IE and the Management Based MDT PLMN List IE is contained in the HANDOVER REQUEST message, the target eNB may, if supported, store the received information in the UE context, and use this information to allow subsequent selections of the UE for management based MDT. In an example, if the Masked IMEISV IE is contained in the HANDOVER REQUEST message the target eNB may, if supported, use it to determine the characteristics of the UE for subsequent handling. In an example, if the HANDOVER REQUEST contains a Target Cell ID IE, as part of the Source eNB to Target eNB Transparent Container IE, for a cell which is no longer active, the eNB may respond with an HANDOVER REQUEST ACKNOWLEDGE in case the PCI of the deactivated cell is in use by another active cell.

In an example, if the ProSe Authorized IE is contained in the HANDOVER REQUEST message and it contains one or more IEs set to "authorized", the eNB may, if supported, consider that the UE is authorized for the relevant ProSe service(s). In an example, if the UE User Plane CIoT Support Indicator IE is included in the HANDOVER REQUEST message and is set to "supported", the eNB may, if supported, consider that User Plane CIoT EPS Optimisation is supported for the UE. In an example, if the CE-mode-B Support Indicator IE is included in the HANDOVER REQUEST ACKNOWLEDGE message and set to "supported", the MME may, if supported, use the extended NAS timer settings for the UE. In an example, if the V2X Services Authorized IE is contained in the HANDOVER REQUEST message and it contains one IE set to "authorized", the eNB may, if supported, consider that the UE is authorized for the relevant service(s).

Figure 14:
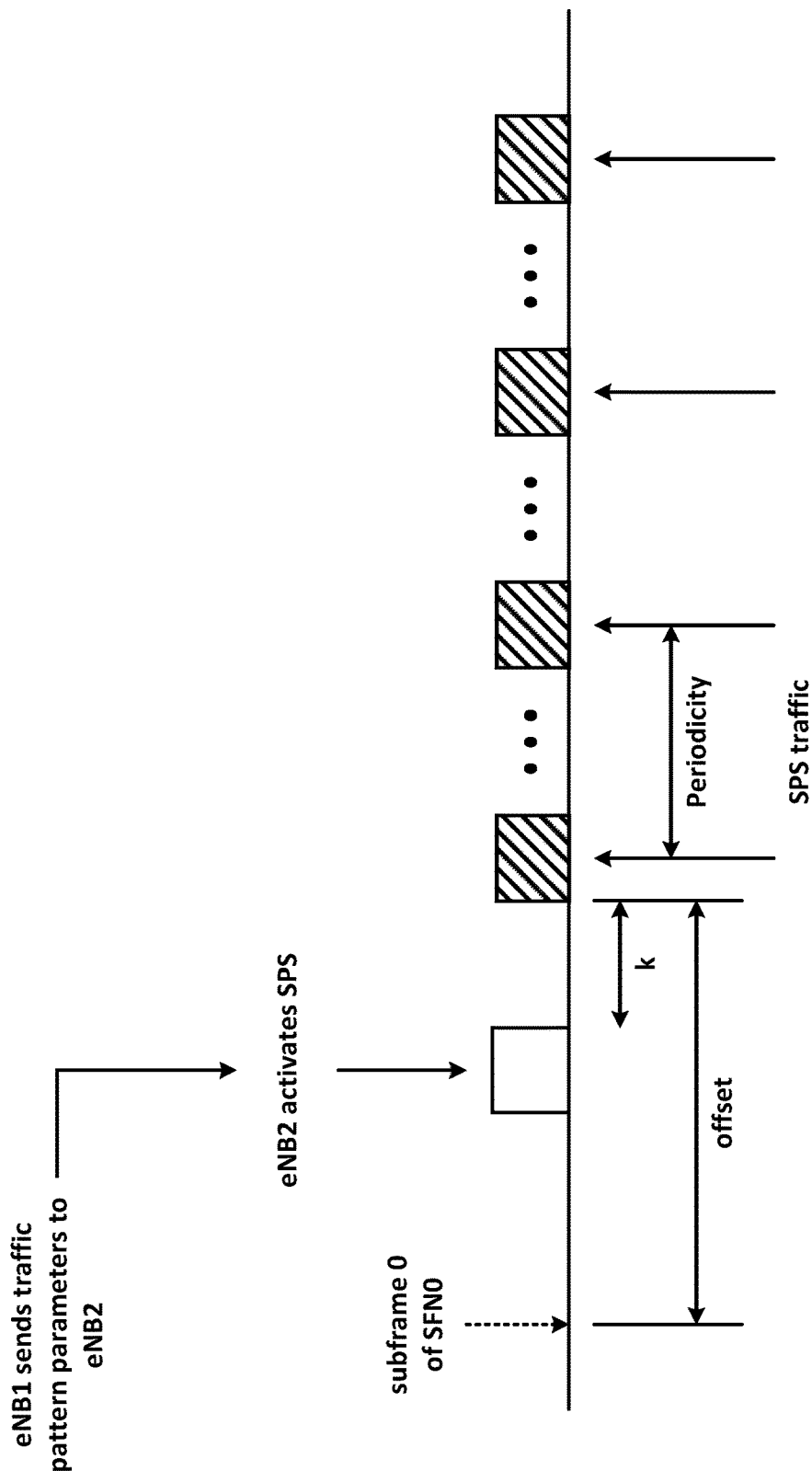
FIG. 14 is a block diagram illustrating an example aspect of an embodiment of the present disclosure.

In an example embodiment, in FIG. 14, a target base station of a handover for a wireless device may receive, from a source base station of the handover, traffic pattern parameters for SPS traffic of the wireless device via a handover request message during the handover procedure. The traffic pattern parameters may comprise a traffic periodicity, a timing offset, and a message size of an SPS traffic. The target base station may determine an activation timing for SPS radio resource based on the timing offset, which may indicate an offset (e.g. offset time value) from subframe 0 of SFN 0. After the wireless device connects to the target base station by performing a random access (RA) procedure, the target base station may transmit an SPS activation control command (via DCI, PDCCH command) to the wireless device based on the determination of the activation timing. The target base station may transmit the SPS activation control command in a subframe corresponding to the activation timing. The wireless device may start transmitting packets of the SPS traffic after "k" time duration from the SPS activation control command.

In an example, the target base station may further determine an SPS periodicity (e.g. SPS resource periodicity) based on the traffic periodicity of the traffic pattern parameters received via the handover request message. The SPS periodicity may be sent to the wireless device via a handover request acknowledge message (e.g. X2 message, S1 message) and a handover command message (e.g. RRC message). After receiving the SPS activation control command and transmitting first packets of the SPS traffic after "k" time duration from the SPS activation control command, the wireless device may transmit further packets of the SPS traffic via SPS resources coming after the SPS periodicity from the first packet transmission. The wireless device may transmit packets of the SPS traffic to the base station periodically with a periodic duration of the SPS periodicity.

An issue with respect to SPS configuration is how eNB configures SPS for the UE and how SPS configuration may be maintained or updated during a handover. In an example embodiment, some UEs may support enhanced SPS configuration, e.g. multiple SPS configuration/activation, SPS on sidelink, SPS configuration/activation on SCell, and/or SPS UE assistance information transmission. SPS configuration may be employed for V2X communications. In an example, V2X configurations may comprise SPS configuration parameters, for example, SPS configuration parameters on PCell and/or SCell. In an example embodiment, SPS may be employed for transmission of V2X traffic. Example V2X messages are shown below.

In an example, cooperative awareness messages (CAM) message generation may be dynamic in terms of size, periodicity and timing. Such changes may result in misalignment between SPS timing and CAM timing. There may be some regularity in size and periodicity between different triggers. SPS may be beneficial for some cases and SPS may be configured. UE assistance may be needed to trigger and/or employ SPS.

In an example, CAM may comprise status information (e.g. time, position, motion state, activated system, and/or the like) and/or attribute information (e.g. data about dimension, vehicle type and/or role in the road traffic, and/or the like). Decentralized environmental notification message (DENM) may comprise information related to a variety of events. Basic safety message (BSM) may comprise some of basic vehicle state information (e.g. message identifier, vehicle identifier, vehicle latitude/longitude, speed, acceleration status, and/or the like) and/or two option data frames (e.g. vehicle safety extension and/or vehicle status).

In an example, the eNB may configure multiple SPS configurations for a given UE. In an example, SPS-configuration-specific MCS (if MCS is part of the SPS-configuration) and/or SPS-configuration-specific periodicity may be configured. Some SPS parameters may differ across the SPS-configurations. The eNB may dynamically trigger/release the different SPS-configurations by use of (E)PDCCH. The UE may indicate to the eNB that it does not intend to transmit data before a transmission associated to an SPS configuration. SPS configuration in the specification refers to V2X and/or enhanced SPS configuration. Legacy LTE devices may support SPS configuration. In the specifications, SPS configuration refers to, for example, multiple SPS configuration/activation, SPS on sidelink, SPS configuration/activation on SCell, and/or SPS UE assistance information transmission, and/or other enhanced SPS features. These configurations may not be necessarily employed for V2X and may be applicable to other applications. In an example, SPS feature may be referred to SPS or enhanced SPS feature.

In an example, a UE may be configured with a first SPS configuration with a serving eNB. In an example, a first SPS configuration for a UE may be decided by a serving eNB based on UE assistance information received from the UE. A target eNB may maintain the same SPS configuration, or may update the UE SPS configuration. The target eNB may have a different cell configuration and may require a different SPS configuration. In another example embodiment, the target eNB may employ cells with the same frequencies as the serving cell and may require maintaining the same SPS configuration. The target eNB may configure SPS configuration after the handover is completed or may configure SPS configuration during the handover process. There is a need for developing a signalling flow, UE processes, and eNB processes to address SPS configuration, and SPS configuration parameter handling, and SPS activation during the handover to reduce the handover overhead and delay, and increase handover efficiency. Furthermore, there is a need to develop handover signalling and handover message parameters to address SPS configuration and/or activation during a handover process.

In an example, according to some of the various aspects of embodiments, in RRC_CONNECTED mode, the network may control UE mobility, for example, the network may decide when the UE connects to which E-UTRA cell(s) or inter-RAT cell. For network controlled mobility in RRC_CONNECTED, the PCell may be changed using an RRC Connection Reconfiguration message including the mobilityControlInfo (handover). The SCell(s) may be changed using the RRC Connection Reconfiguration message either with or without the mobilityControlInfo. The network may trigger the handover procedure e.g. based on radio conditions, load, QoS, UE category, and/or the like. To facilitate this, the network may configure the UE to perform measurement reporting (possibly including the configuration of measurement gaps). The network may also initiate handover blindly, for example without having received measurement reports from the UE. Before sending the handover message to the UE, the source eNB may prepare one or more target cells. The source eNB may select the target PCell. The source eNB may also provide the target eNB with a list of best cells on each frequency for which measurement information is available, for example, in order of decreasing RSRP. The source eNB may also include available measurement information for the cells provided in the list. The target eNB may decide which SCells are configured for use after handover, which may include cells other than the ones indicated by the source eNB.

In an example, according to some of the various aspects of embodiments, the target eNB may generate a message used to configure the UE for the handover, for example, the message including the access stratum configuration to be used in the target cell(s). The source eNB may transparently (for example, does not alter values/content) forward the handover message/information received from the target eNB to the UE. When appropriate, the source eNB may initiate data forwarding for (a subset of) the dedicated radio bearers. After receiving the handover message, the UE may attempt to access the target PCell at the available RACH occasion according to a random access resource selection. When allocating a dedicated preamble for the random access in the target PCell, E-UTRA may ensure the preamble is available from the first RACH occasion the UE may use. Upon successful completion of the handover, the UE may send a message used to confirm the handover to the target eNB.

In an example, according to some of the various aspects of embodiments, if the target eNB does not support the release of RRC protocol which the source eNB used to configure the UE, the target eNB may be unable to comprehend the UE configuration provided by the source eNB. In this case, the target eNB may use the full configuration option to reconfigure the UE for handover and re-establishment. Full configuration option includes an initialization of the radio configuration, which makes the procedure independent of the configuration used in the source cell(s) with the exception that the security algorithms are continued for the RRC re-establishment.

In an example, according to some of the various aspects of embodiments, after the successful completion of handover, PDCP SDUs may be re-transmitted in the target cell(s). This may apply for dedicated radio bearers using RLC-AM mode and/or for handovers not involving full configuration option. After the successful completion of handover not involving full configuration option, the SN (sequence number) and/or the HFN (hyper frame number) may be reset for some radio bearers. For the dedicated radio bearers using RLC-AM mode both SN and HFN may continue. For reconfigurations involving the full configuration option, the PDCP entities may be newly established (SN and HFN may not continue) for dedicated radio bearers irrespective of the RLC mode. UE behavior to be performed upon handover may be the same regardless of the handover procedures used within the network (e.g. whether the handover includes X2 or S1 signalling procedures).

In an example, the source eNB may, for some time, maintain a context to enable the UE to return in case of handover failure. After having detected handover failure, the UE may attempt to resume the RRC connection either in the source PCell or in another cell using the RRC re-establishment procedure. This connection resumption may succeed if the accessed cell is prepared. For example, when the access cell is a cell of the source eNB or of another eNB towards which handover preparation has been performed. The cell in which the re-establishment procedure succeeds becomes the PCell while SCells, if configured, may be released.

In an example, normal measurement and mobility procedures may be used to support handover to cells broadcasting a CSG (closed subscriber group) identity. In addition, E-UTRAN may configure the UE to report that it is entering or leaving the proximity of cell(s) included in its CSG whitelist. E-UTRAN may request the UE to provide additional information broadcast by the handover candidate cell e.g. cell global identity, CSG identity, CSG membership status. E-UTRAN may use the proximity report to configure measurements as well as to decide whether or not to request additional information broadcast by the handover candidate cell. The additional information may be used to verify whether or not the UE is authorized to access the target PCell and may also be needed to identify handover candidate cell. This may involve resolving PCI confusion, for example, when the physical layer identity that is included in the measurement report may not uniquely identify the cell.

In an example, according to some of the various aspects of embodiments, configuration of SPS may be configured by the serving eNB with RRC signalling. The mechanism for SPS configuration and reconfiguration may be based on RRC signalling. When needed, configuration of SPS may be reconfigured with RRC signalling. In an example, the mapping between an SCell and a SPS may not be reconfigured with RRC while the SCell is configured. For example, if there is a need modify SPS configurations, at least one RRC message, for example at least one RRC reconfiguration message, may be send to the UE to reconfigure SPS configurations.

In an example, according to some of the various aspects of embodiments, when an eNB performs Cell addition configuration, the related SPS configuration may be configured for the Cell. The eNB may modify SPS configuration of a cell by removing (releasing) the cell and adding a new cell (with same physical cell ID and frequency) with an updated SPS (e.g. updated SPS ID). The new Cell with the updated SPS may be initially inactive subsequent to joining the updated SPS. The eNB may activate the updated new SCell and/or start scheduling packets on the activated SCell.

In an example, according to some of the various aspects of embodiments, an eNB may consider UE's capability in configuring one or more SPS for a UE. A UE may be configured with a configuration that is compatible with UE capability. Enhanced SPS capability may be an optional feature in LTE release 14 (and/or beyond). The UE may transmit its SPS capability to a serving eNB via an RRC message and eNB may consider the UE capability in configuring SPS configuration.

In an example, according to some of the various aspects of embodiments, a UE may transfer to an eNB assistance information that the receiving eNB may consider when configuring an SPS configuration for the UE. The mechanism for transferring UE assistance information may be based on RRC signaling and/or MAC signaling. In an example, an RRC signaling message (e.g. UEAssistanceInformation message) and/or a MAC CE message (MAC signaling message) may be used to transfer UE assistance information for SPS configuration from a UE to an eNB.

In an example, the purpose of RRC connection reconfiguration procedure may be to modify an RRC connection, e.g. to establish, modify and/or release RBs, to perform handover, to setup, modify, and/or release measurements, to add, modify, and/or release SCells. As part of the procedure, NAS dedicated information may be transferred from E-UTRAN to the UE. If the received RRC Connection Reconfiguration message includes the sCellToReleaseList, UE performs SCell release. If the received RRC Connection Reconfiguration message includes the sCellToAddModList, UE performs SCell additions or modification.

In an example, the UE context within the source eNB may contain information regarding roaming/handover restrictions which may be provided either at connection establishment or at the last TA (tracking area) update process. The source eNB may configure the UE measurement procedures employing at least one RRC connection reconfiguration message. The UE may be triggered to send at least one measurement report by the rules set by, for example, system information, RRC configuration, and/or the like. The source eNB may make a handover decision based on many parameters, for example, the measurement reports, RRM information, traffic and load, a combination of the above, and/or the like. The source eNB may initiate the handover procedure by sending a handover request message to one or more potential target eNBs. When the source eNB sends the handover request message, it may start a handover preparation timer. Upon reception of the handover request acknowledgement message the source eNB may stop the handover preparation timer.

In an example, in an X2 handover process in FIG. 10, the source eNB may transmit a handover request message to one or more potential target eNB passing information to prepare the handover at the target side. The handover request message may comprise SPS capability information of the UE. In an example embodiment, handover request message may further comprise the current SPS configuration of the UE connected to the serving eNB. In an example embodiment, the handover request message may further comprise the UE assistance information received from the UE for SPS configuration. In an example, an RRC Context IE in the handover request message may contain the SPS capability information, the current SPS configuration, and/or the UE assistance information. In an example, an as-Context IE in the HandoverPreparationInformation message (RRC Context IE in the handover request message) may contain the UE assistance information.

In an example, in an S1 handover process without MME relocation in FIG. 11, the source eNB may transmit a handover required message to an MME for one or more potential target eNB, and the MME may transmit a handover request message to the potential target eNBs. The handover required message, and/or the handover request message may pass information to prepare the handover at the target side. The handover required message, and/or the handover request message may comprise SPS capability information of the UE, the current SPS configuration of the UE in the serving eNB, and/or UE assistance information received from the UE for SPS configuration. In an example, a Source to Target Transparent Container IE in the handover required message and/or the handover request message may contain the SPS capability information, the current SPS configuration, and/or the UE assistance information.

In an example, in an S1 handover process relocating an MME in FIG. 12, the source eNB may transmit a handover required message to a source MME for one or more potential target eNB, the source MME may transmit a forward relocation request message to one or more potential target MMEs serving the potential target eNBs, and the potential target MMEs may transmit a handover request message to the potential target eNBs. The handover required message, the forward relocation request message, and/or the handover request message may pass information to prepare the handover at the target side. The handover required message, the forward relocation request message, and/or the handover request message may comprise SPS capability information of the UE, the current SPS configuration of the UE in the serving eNB, and/or UE assistance information received from the UE for SPS configuration. In an example, a Source to Target Transparent Container IE in the handover required message and/or the handover request message may contain the SPS capability information, the current SPS configuration, and/or the UE assistance information. In an example, an E-UTRAN Transparent Container IE in the forward relocation request message may contain the SPS capability information, the current SPS configuration, and/or the UE assistance information.

In an example, during the handover preparation phase, the serving eNB may transmit UE's SPS capability, UE's current SPS configuration (SPS of the UE in connection with the serving eNB), and/or UE assistance information received from the UE for SPS configuration to one or more potential target eNBs. This information may be employed, at least in part, by the potential target eNB to configure the UE, for example, to configure SPS configuration parameters that may be employed after completing the handover.

In an example, the target eNB may employ the SPS capability, the SPS configuration (SPS of the UE in connection with the serving eNB) and/or UE assistance information of the UE in order to properly configure SPS configuration of the UE before UE connects to the target UE. The target eNB may configure the UE considering the SPS configuration limitations and capabilities of the UE. For example, if the UE does not support SPS capability, the target eNB may not configure the UE with SPS(s). In another example, a UE may not support SPS configuration, and eNB may consider this in configuring the UE before the UE accesses the target eNB.

In an example, handover admission control may be performed by the target eNB dependent on many factors, for example, QoS required for the UE bearers, UE capabilities, UE configuration, target eNB load, a combination of the above, and/or the like. The target eNB may configure the required resources according to the received information from the serving eNB and may reserve a C-RNTI and/or a RACH preamble. The access stratum configuration to be used in the target cell may be specified independently (for example as an establishment) or as a delta compared to the access stratum-configuration used in the source cell (for example as a reconfiguration).

In an example, the target eNB may prepare handover with L1/L2 and may send the handover request acknowledge message to the source eNB. In an X2 handover procedure, the handover request acknowledge message may include a transparent container to be sent to the UE as an RRC message to perform the handover. In an S1 handover procedure without MME relocation, the handover request acknowledge message from the target eNB to the MME and/or the handover command message from the MME to the source eNB may include a transparent container to be sent to the UE as an RRC message to perform the handover. In an S1 handover procedure relocating an MME, the handover request acknowledge message from the target eNB to the target MME, the forward relocation response message from the target MME to the source MME, and/or the handover command message from the source MME to the source eNB may include a transparent container to be sent to the UE as an RRC message to perform the handover. The container may include a new C-RNTI, target eNB security algorithm identifiers for the selected security algorithms, a dedicated RACH preamble, access parameters, SIBs, and/or other configuration parameters. The transparent container may further comprise the SPS configurations for connection of the UE to the target eNB. The SPS configurations may modify the SPS of the UE or may keep the same SPS configuration that the UE has with the serving base station. The target eNB may generate the RRC message to perform the handover, for example, RRC connection reconfiguration message including the mobility control information. The RRC message may be sent by the source eNB towards the UE.

In an example, the source eNB may perform the necessary integrity protection and ciphering of the message. The UE may receive the RRC connection reconfiguration message from the source eNB and may start performing the handover. The UE may not need to delay the handover execution for delivering the HARQ/ARQ responses to the source eNB.

In an example, after receiving the RRC connection reconfiguration message including the mobility control information, UE may perform synchronisation to the target eNB and accesses the target cell via RACH on the primary cell. The UE Random access procedure may employ a contention-free procedure if a dedicated RACH preamble was indicated in the mobility control information. The UE random access procedure may employ a contention-based procedure if no dedicated preamble was indicated. The UE may derive target eNB specific keys and may configure the selected security algorithms to be used in the target cell. The target eNB may respond with uplink allocation and timing advance.

In an example, after the UE has successfully accessed the target cell, the UE may send an RRC connection reconfiguration complete message (C-RNTI) to confirm the handover and to indicate that the handover procedure is completed for the UE. UE may transmit a MAC uplink Buffer Status Report (BSR) Control Element (CE) along with the uplink RRC Connection Reconfiguration Complete message or may transmit a MAC uplink BSR CE whenever possible to the target eNB. UE may transmit, along with the uplink RRC Connection Reconfiguration Complete message, UE assistance information that the receiving eNB may consider when configuring an SPS configuration for the UE. In an example, a MAC CE message may contain the UE assistance information for an SPS configuration for the UE in the target eNB. The target eNB verifies the C-RNTI sent in the RRC Connection Reconfiguration Complete message. The target eNB may now begin sending data to the UE and receiving data from the UE.

In an example, after receiving the RRC Connection Reconfiguration Complete message, the target eNB may activate one or more SPSs that was configured by the target eNB during the handover preparation procedure. In an example, the target eNB may use the information in the UE assistance information (e.g., message size, periodicity, timing offset, e.g., offset to subframe 0 of SFN0) to determine the next packet generation time by the UE. In an example, the target eNB may consider the message size information in the UE assistance information to determine the grant size in the SPS activation DCI.

In an example, the target eNB may determine the next packet generation time employing the UE assistance information. For example, the target eNB employs offset information (e.g. offset to SF0 of SFN0, or other offset information fields) and/or period in the assistance information to determine a next packet generation time. In an example, the next packet generation time is a first subframe after receiving the RRC connection reconfiguration complete message.

In an example, after receiving the RRC Connection Reconfiguration Complete message, the target eNB may consider the next packet generation time and send the DCI for SPS activation k subframes (e.g. k=4) earlier than the next packet generation time. In an example k may depend on frame structure type, e.g. TDD vs. FDD. For TDD frame structure type, k may depend on the subframe number and TDD configuration.

In an example, the target eNB may consider the first packet generation time which occurs k subframes (e.g. k=4) or later after the target eNB receives the RRC Connection Reconfiguration Complete message and may send the SPS activation DCI k subframes (e.g. k=4) earlier than that subframe. In an example, target eNB may transmit the SPS activation DCI after the target eNB receives the RRC Connection Reconfiguration Complete message (e.g., immediately) and the UE may use the grant at the appropriate packet generation times.

In an example, according to some of the various aspects of embodiments, a serving base station may receive a first message from a wireless device on a primary cell in a plurality of cells. The first message may be an RRC UE capability message. The plurality of cells may comprise the primary cell and at least one secondary cell. The first message may comprise at least one parameter indicating whether the wireless device supports configuration of SPS(s). The base station may receive a plurality of radio capability parameters from the wireless device.

In an example, according to some of the various aspects of embodiments, a serving base station may receive a first message from a wireless device on a primary cell in a plurality of cells. The first message may be an RRC signaling message (e.g. a UE AssistanceInformation message) and/or a MAC CE message. The plurality of cells may comprise the primary cell and at least one secondary cell. The first message may comprise at least UE assistance information that a base station may consider when the base station configures SPS configurations for the UE. The base station may receive a plurality of UE assistance information from the wireless device.

In an example embodiment, the capability message may comprise one or more parameters explicitly and/or implicitly indicating that the UE support configuration of SPS. For example, a parameter may indicate that the UE is capable of handling some types of V2X configuration, and this may imply that the UE is SPS capable. In an example, a parameter may indicate that the UE is capable of supporting a set of enhanced configuration parameters including enhanced SPS (e.g. SPS). In an example, a parameter may explicitly indicate that the UE is capable of handling enhanced SPS configuration. The eNB after receiving the UE capability message, may determine whether the UE can support configuration of enhanced SPS (SPS). The UE may selectively configure SPS for a UE by transmitting one or more RRC messages to the UE. In an example embodiment, the capability may be received on a first signalling bearer on the primary cell. The plurality of radio capability parameters may comprise a first sequence of one or more radio configuration parameters. A first radio configuration parameter in the first sequence may comprise a first parameter indicating whether SPS may be supported for a first band and/or first band combination. The first band and/or first band combination may be in a second sequence of one or more band combinations. The index of the first radio configuration parameter in the first sequence may determine the index of the first band combination in the second sequence.

In an example, according to some of the various embodiments, the size of the first sequence may be the same as the size of the second sequence. The index may determine the order of: the first radio configuration parameter in the first sequence; and the first band combination in the second sequence. The first band combination may be identified by a first band combination parameter. The first band combination parameter may comprise a list of band identifier(s). Each of the band identifier(s) may be one of a finite set of numbers. Each of the numbers may identify a specific band.

In an example, according to some of the various embodiments, the wireless device may support one or more inter-band SPSs if the list of band identifier(s) includes more than one band; and the first parameter indicates that SPS is supported. In yet other embodiments, the wireless device may support multiple intra-band SPS if the list of band identifier(s) includes one band; and the first parameter indicates that SPS is supported.

In an example, according to some of the various embodiments, the wireless device may not support SPS if none of the radio configuration parameters comprise a parameter indicating that SPS is supported.

In an example embodiment, a wireless device may transmit an RRC message comprising UE capability information. The UE capability information may comprise one or more information elements comprising wireless device LTE radio capability parameters. The LTE radio capability parameters may comprise a plurality of parameters indicating various capability of the wireless device LTE radio.

In an example, the serving base station may selectively transmit at least one second message to the wireless device if the at least one parameter indicates support for configuration of SPS. The at least one second message may configure SPS in the wireless device. If the at least one parameter does not indicate support for configuration SPS, the base station may not configure SPS in the wireless device. If the at least one parameter indicates support for configuration of the SPS, the base station may or may not configure SPS in the wireless device depending on the required wireless device configuration and many other parameters, such as types of application running on the UE and the traffic requirements. Transmission or not transmission (selective transmission) of at least one second message to configure SPS is determined by the base station based on many criteria described in this specification.

In an example, the at least one second control message may be configured to cause in the wireless device configuration of at least one cell in the plurality of cells and configuration of SPS. The first SPS may comprise a first subset of the plurality of cells. The second SPS may comprise a second subset of the at least one secondary cell.

In an example, the at least one second control message may be configured to further cause in the wireless device configuration of one or more SPS configuration. A cell add-modify information element may comprise a first plurality of dedicated parameters. The first plurality of dedicated parameters may comprise a first cell index for a first secondary cell in the at least one secondary cell. The at least one second control message may further include configuration information for physical channels for the wireless device. The at least one second control message may be configured to further cause the wireless device to set up or modify at least one radio bearer.

In an example, the serving base station may receive at least one measurement report from the wireless device in response to the at least one second message. The at least one measurement report may comprise signal quality information of at least one of the at least one cell of at least one of the at least one target base station. The signal quality information may be derived at least in part employing measurements of at least one OFDM subcarrier. The serving base station may make a handover decision, based, at least in part, on the at least one measurement report, and/or other parameters, such as load, QoS, mobility, etc. The serving base station may also make a decision depending on base station internal proprietary algorithm.

In an example, the serving base station may transmit at least one third message to at least one of the at least one target base station. The at least one third message may comprise the at least one parameter indicating whether the wireless device supports configuration of SPS. The at least one third message may comprise a plurality of parameters of the configuration at least indicating association between at least one cell and a corresponding SPS (configuration information of one or more SPSs). The at least one third message may be a handover request message transmitted to at least one target base station to prepare the target base stations for the handover of the wireless device. The UE capability parameters may be included in the at least one third message. UE dedicated radio parameters comprising UE SPS configuration may also be included in the handover request message. UE dedicated radio parameters may comprise MACMainconfig information element. UE dedicated radio parameters may comprise SPS configuration including SPS indices and associated cell indices.

In an example, according to some of the various aspects of embodiments, a serving base station, in response to making a handover decision by the serving base station for a wireless device, may transmit at least one third message to at least one target base station. The at least one third message may comprise the at least one parameter indicating whether the wireless device supports configuration of SPS. The format of the parameter (information element) indicating whether the wireless device supports configuration of a SPS is the same format as the UE capability message transmitted by the wireless device to the base station in the first message as described in the specification. The at least one third message may further comprise a plurality of parameters of the configuration of SPS (configuration information of SPS). The parameters included in the configuration information of SPS may be the same as the ones included in the at least one second message as described in this specification. The at least one third message may be a handover request message transmitted to at least one target base station to prepare the target base stations for the handover of the wireless device. The UE capability parameters may be included in the at least one third message. UE dedicated radio parameters comprising UE SPS configuration may also be included in the handover request message. UE dedicated radio parameters may comprise MACMainconfig information element. UE dedicated radio parameters may comprise SPS configuration including SPS indices and associated cell indices.

In an example, the serving base station may receive from one of the at least one target base station at least one fourth message. The at least one fourth message may comprise configuration of a plurality of cells for the wireless device. The plurality of cells may comprise a primary cell and at least one secondary cell. The configuration may associate SPS configuration with a cell in the plurality of cells.

In an example, the serving base station may transmit a fifth message to the wireless device. The fifth message may comprise a plurality of parameters of the configuration at least indicating association between at least one cell and a corresponding SPS (configuration information of SPS). The fifth message may cause the wireless device to start a synchronization process with the target base station (with a cell in the target base station).

In an example, the base station may, before transmission of the fifth message, encrypt the fifth message and protect the fifth message by an integrity header. The fifth message may further include configuration information for physical channels for the wireless device. The fifth message may be configured to cause the wireless device to set up or modify at least one radio bearer. The fifth message may be configured to further cause the wireless device to configure at least one of a physical layer parameter, a MAC layer parameter, and an RLC layer parameter. The plurality of cells of the target base station may be in more than one frequency band, for example, one or more cells may be in frequency band A and one or more other cells may be in frequency band B (inter-band carrier aggregation). The wireless device may support configuration of SPS.

In an example, a source base station may transmit, to a target base station, a first message comprising assistance information. The assistance information may comprise one or more fields indicating at least one of semi-persistent scheduling (SPS) periodicity, SPS message size or SPS timing offset. The target base station may transmit, to the source base station, a second message comprising one or more SPS configuration parameters. At least one of the one or more SPS configuration parameters may be determined by target base station at least based on the assistance information. The source base station may transmit, to a wireless device, a third message comprising the SPS configuration parameters.

In an example, the target base station may transmit, to the wireless device, an SPS activation downlink control information (DCI). The SPS activation DCI may comprise a grant size determined based on the SPS message size. In an example, the target base station may transmit, to the wireless device, an SPS activation downlink control information (DCI) in a subframe determined at least based on the UE assistance information.

As shown in FIGS. 10-12, a wireless device may transmit, to a target base station, a random access preamble during a handover procedure. The wireless device may receive, from the target base station, a random access response (RAR) message. The RAR message may comprise a grant for the wireless device. The wireless device may transmit, to the target base station, a third message comprising assistance information. The assistance information may comprise at least one of semi-persistent scheduling (SPS) periodicity, SPS message size, and/or SPS timing offset.

In an example, the target base station may transmit, to the wireless device, an SPS activation downlink control information (DCI) comprising a grant size, the grant size determined based on the SPS message size. In an example, the target base station may transmit, to the wireless device, an SPS activation downlink control information (DCI) in a subframe determined at least based on the UE assistance information.

In an example, SPS radio resources comprise SPS resource, SPS resource configurations, and/or the like. An SPS activation control command may comprise an SPS activation command, an SPS activation message, an SPS activation indication, and/or the like. In an example, SPS traffic may comprise SPS data, SPS packets, SPS traffic packets, V2X data, V2X packets, periodic data, periodic packets, and/or the like. A periodicity may comprise a time duration, a number of subframes, an absolute time value, a relative time value, and/or the like. An offset may comprise a relative time value (e.g. −1, −2, +1, +3, and/or the like).

According to various embodiments, a device (such as, for example, a wireless device, an off-network wireless device, a base station, and/or the like), may comprise, for example, one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 15:
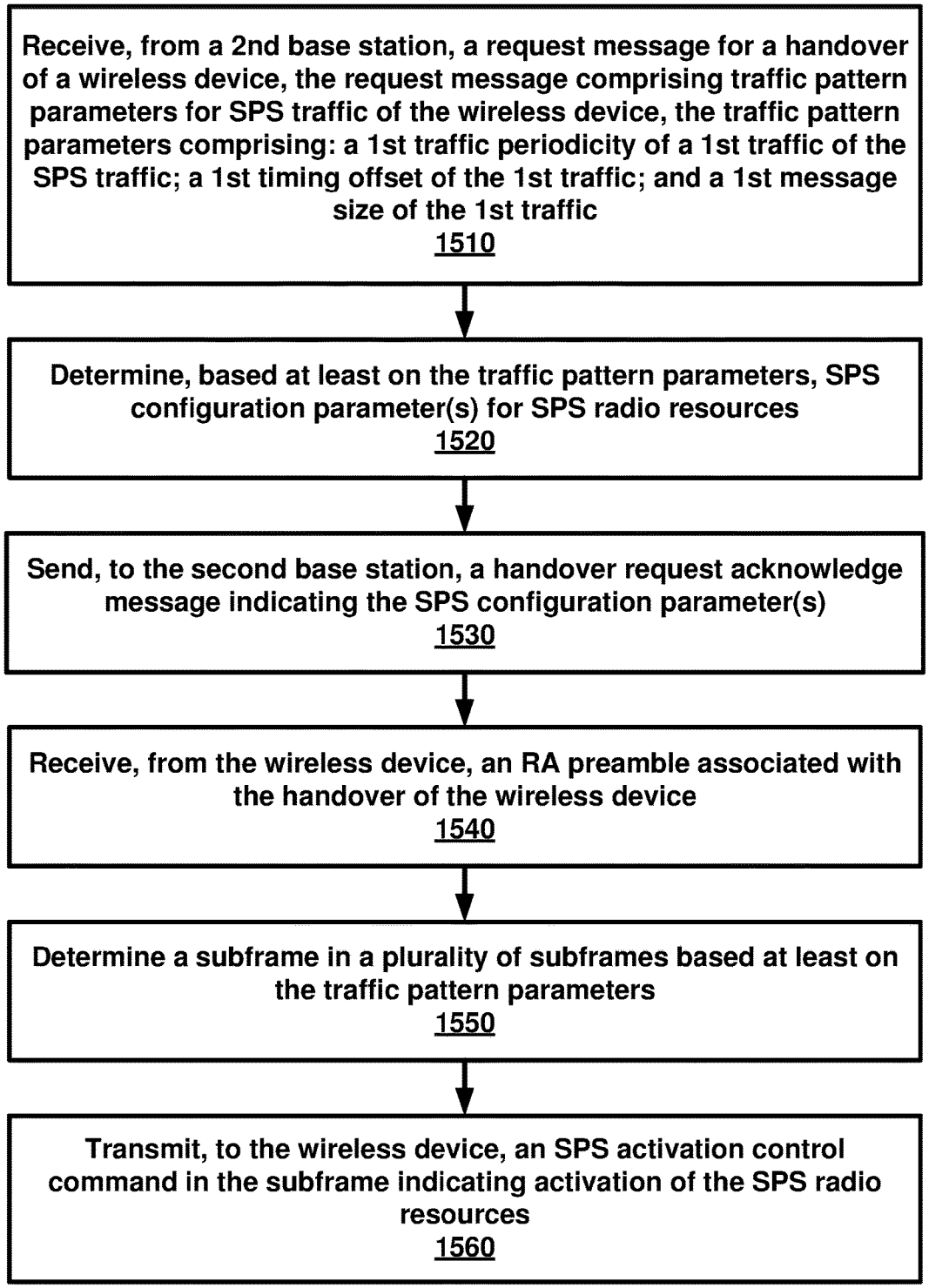
FIG. 15 is an example flow diagram as per an aspect of an embodiment of the present disclosure.

FIG. 15 is an example flow diagram as per an aspect of an embodiment of the present disclosure. At 1510, a first base station may receive a request message for a handover of a wireless device from a second base station. The request message may comprise traffic pattern parameters for one or more semi-persistent scheduling (SPS) traffic of the wireless device. The traffic pattern parameters may comprise: a first traffic periodicity of a first traffic of the one or more SPS traffic; a first timing offset of the first traffic; and a first message size of the first traffic. At 1520, the first base station may determine, based at least on the traffic pattern parameters, at least one SPS configuration parameter for SPS radio resources. At 1530, the first base station may send a handover request acknowledge message to the second base station. The handover request acknowledge message may indicate the at least one SPS configuration parameter. At 1540, the first base station may receive a random access (RA) preamble from the wireless device. The RA preamble may be associated with the handover of the wireless device. At 1550, a subframe in a plurality of subframes based at least on the traffic pattern parameters may be determined. At 1560, the first base station may transmit, to the wireless device, an SPS activation control command in the subframe indicating activation of the SPS radio resources.

According to an embodiment, the second base station may receive the traffic pattern parameters from the wireless device via a UE assistance information message. According to an embodiment, the second base station may transmit to the wireless device, a handover command message indicating the at least one SPS configuration parameter in response to receiving the handover request acknowledge message. According to an embodiment, the at least one SPS configuration parameter may comprise an SPS periodicity for the SPS radio resources. According to an embodiment, the SPS activation control command may comprise a resource block assignment determined based on the first message size. According to an embodiment, the transmitting of the SPS activation control command may be after a transmission of an RA response message in response to the RA preamble. According to an embodiment, the transmitting of the SPS activation control command may be via a downlink control information.

Figure 16:
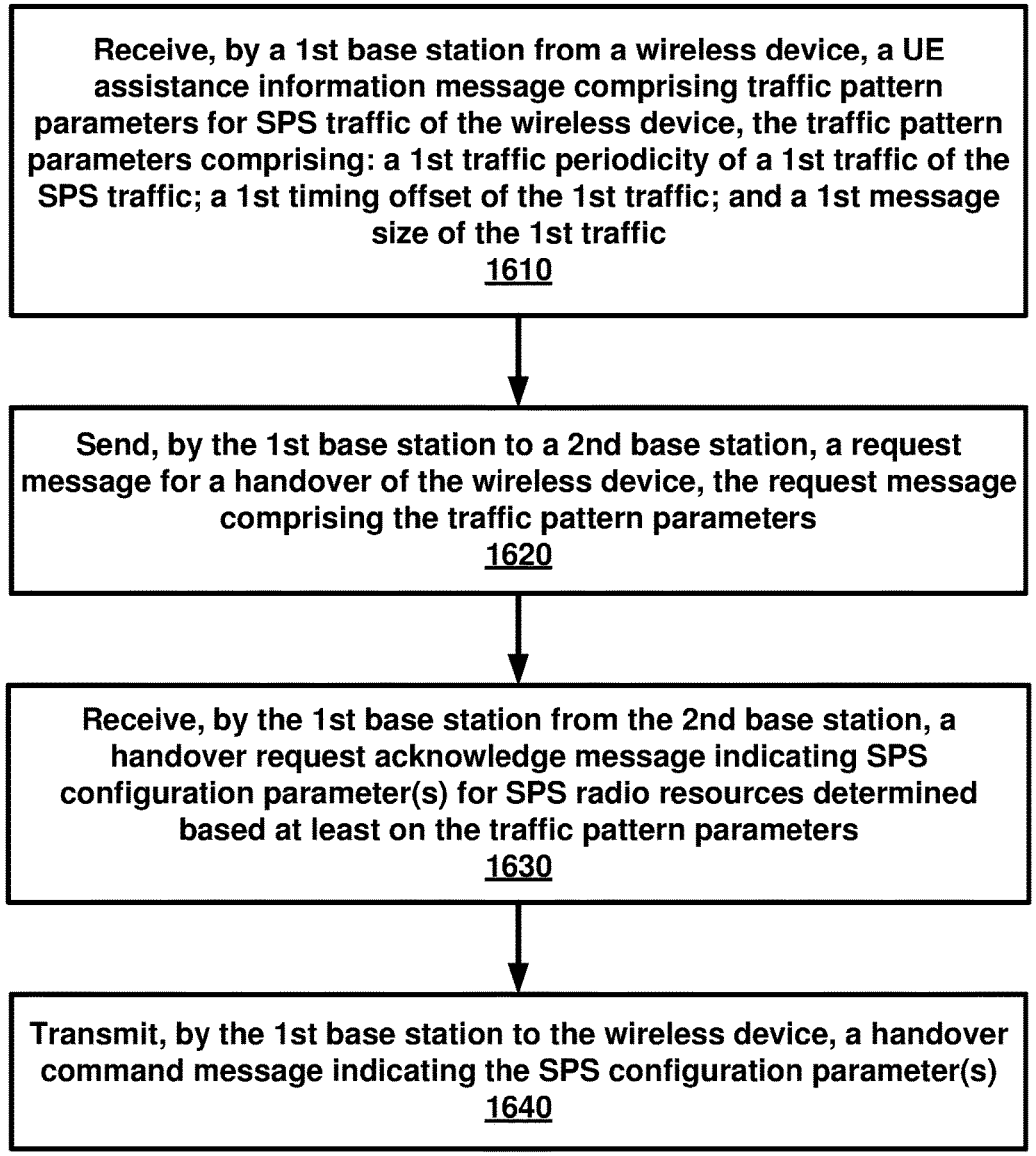
FIG. 16 is an example flow diagram as per an aspect of an embodiment of the present disclosure.

FIG. 16 is an example flow diagram as per an aspect of an embodiment of the present disclosure. At 1610, a first base station may receive a UE assistance information message from a wireless device. The UE assistance information message may comprise traffic pattern parameters for one or more SPS traffic of the wireless device. The traffic pattern parameters may comprise: a first traffic periodicity of a first traffic of the one or more SPS traffic; a first timing offset of the first traffic; and a first message size of the first traffic. At 1620, the first base station may send, to a second base station, a request message for a handover of the wireless device. The request message may comprise the traffic pattern parameters. At 1630, the first base station may receive from the second base station, a handover request acknowledge message indicating at least one SPS configuration parameter for SPS radio resources determined based at least on the traffic pattern parameters. At 1640, the first base station may transmit to the wireless device, a handover command message indicating the at least one SPS configuration parameter.

According to an embodiment, the at least one SPS configuration parameter may comprise an SPS periodicity for the SPS radio resources. According to an embodiment, the second base station may receive from the wireless device, a random access (RA) preamble associated with the handover of the wireless device. According to an embodiment, a subframe in a plurality of subframes may be determined based at least on the traffic pattern parameters. According to an embodiment, the second base station may transmit to the wireless device, an SPS activation control command in the subframe indicating activation of the SPS radio resources. According to an embodiment, the SPS activation control command may comprise a resource block assignment determined based on the first message size. According to an embodiment, the transmission of the SPS activation control command may be after a transmission of an RA response message in response to the RA preamble. According to an embodiment, the transmission of the SPS activation control command may be via a downlink control information.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, MATLAB or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in a system comprising one or more TDD cells (e.g. frame structure 2 and/or frame structure 3-licensed assisted access). The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112.

The invention claimed is:

1. A method comprising:
   receiving, by a first base station from a second base station, a request message for a handover of a wireless device, wherein the request message comprises traffic pattern parameters for one or more semi-persistent scheduling (SPS) traffic of the wireless device, the traffic pattern parameters comprising:
      a first traffic periodicity of a first traffic of the one or more SPS traffic;
      a first timing offset of the first traffic; and
      a first message size of the first traffic;
   determining, based at least on the traffic pattern parameters, at least one SPS configuration parameter for SPS radio resources;
   sending, to the second base station, a handover request acknowledge message indicating the at least one SPS configuration parameter;
   receiving, from the wireless device, a random access (RA) preamble associated with the handover of the wireless device;
   determining a subframe in a plurality of subframes based at least on the first traffic periodicity and the first timing offset; and
   transmitting, in the subframe, to the wireless device, an SPS activation control command indicating activation of the SPS radio resources.

2. The method of claim 1, further comprising receiving, by the second base station, the traffic pattern parameters from the wireless device via a UE assistance information message.

3. The method of claim 1, further comprising transmitting, by the second base station to the wireless device, a handover command message indicating the at least one SPS configuration parameter in response to receiving the handover request acknowledge message.

4. The method of claim 1, wherein the at least one SPS configuration parameter comprises an SPS periodicity for the SPS radio resources.

5. The method of claim 1, wherein the SPS activation control command comprises a resource block assignment determined based on the first message size.

6. The method of claim 1, wherein the transmitting of the SPS activation control command is after a transmission of an RA response message in response to the RA preamble.

7. The method of claim 1, wherein the transmitting of the SPS activation control command is via a downlink control information.

8. A base station comprising:
   one or more processors;
   memory storing instructions that, when executed by the one or more processors, cause the base station to:
      receive, from a second base station, a request message for a handover of a wireless device, wherein the request message comprises traffic pattern parameters for one or more semi-persistent scheduling (SPS) traffic of the wireless device, the traffic pattern parameters comprising:
- a first traffic periodicity of a first traffic of the one or more SPS traffic;
- a first timing offset of the first traffic; and
- a first message size of the first traffic;

determine, based at least on the traffic pattern parameters, at least one SPS configuration parameter for SPS radio resources;

send, to the second base station, a handover request acknowledge message indicating the at least one SPS configuration parameter;
- receive, from the wireless device, a random access (RA) preamble associated with the handover of the wireless device;
- determine a subframe in a plurality of subframes based at least on the first traffic periodicity and the first timing offset; and
- transmit, in the subframe, to the wireless device, an SPS activation control command indicating activation of the SPS radio resources.

9. The base station of claim 8, wherein the second base station receives the traffic pattern parameters from the wireless device via a UE assistance information message.

10. The base station of claim 8, wherein the second base station transmits to the wireless device a handover command message indicating the at least one SPS configuration parameter in response to receiving the handover request acknowledge message.

11. The base station of claim 8, wherein the at least one SPS configuration parameter comprises an SPS periodicity for the SPS radio resources.

12. The base station of claim 8, wherein the SPS activation control command comprises a resource block assignment determined based on the first message size.

13. The base station of claim 8, wherein the instructions, when executed, further cause the base station to transmit the SPS activation control command after a transmission of an RA response message in response to the RA preamble.

14. The base station of claim 8, wherein the instructions, when executed, further cause the base station to transmit the SPS activation control command via a downlink control information.

15. A method comprising:
receiving, by a first base station from a wireless device, a UE assistance information message comprising traffic pattern parameters for one or more semi-persistent scheduling (SPS) traffic of the wireless device, the traffic pattern parameters comprising:
- a first traffic periodicity of a first traffic of the one or more SPS traffic;
- a first timing offset of the first traffic; and
- a first message size of the first traffic;

sending, to a second base station, a request message for a handover of the wireless device, the request message comprising the traffic pattern parameters, wherein the traffic pattern parameters enable the second base station to determine a subframe in a plurality of subframes for transmission of an SPS activation control command to the wireless device based at least on the first traffic periodicity and the first timing offset;

receiving, from the second base station, a handover request acknowledge message indicating at least one SPS configuration parameter for SPS radio resources determined based at least on the traffic pattern parameters; and transmitting, to the wireless device, a handover command message indicating the at least one SPS configuration parameter.

16. The method of claim 15, wherein the at least one SPS configuration parameter comprises an SPS periodicity for the SPS radio resources.

17. The method of claim 15, further comprising:
receiving, by the second base station from the wireless device, a random access (RA) preamble associated with the handover of the wireless device;
determining a subframe in a plurality of subframes based at least on the traffic pattern parameters; and
transmitting, by the second base station to the wireless device, an SPS activation control command in the subframe indicating activation of the SPS radio resources.

18. The method of claim 17, wherein the SPS activation control command comprises a resource block assignment determined based on the first message size.

19. The method of claim 17, wherein the transmitting of the SPS activation control command is after a transmission of an RA response message in response to the RA preamble.

20. The method of claim 17, wherein the transmitting of the SPS activation control command is via a downlink control information.

* * * * *